(12) United States Patent
Stanwood et al.

(10) Patent No.: US 8,130,699 B2
(45) Date of Patent: *Mar. 6, 2012

(54) MULTI-BAND CHANNEL AGGREGATION

(75) Inventors: Kenneth L. Stanwood, San Diego, CA (US); Ramon Khalona, San Diego, CA (US); Lei Wang, San Diego, CA (US); Yair Bourlas, San Diego, CA (US); Gene W. Marsh, San Diego, CA (US); Robert P. Gilmore, Poway, CA (US); Ron Porat, San Diego, CA (US); Paul W. Piggin, Wilshire (GB)

(73) Assignee: Wi-LAN, Inc., Ottawa, Ontario (CA)

( * ) Notice: Subject to any disclaimer, the term of this patent is extended or adjusted under 35 U.S.C. 154(b) by 1399 days.

This patent is subject to a terminal disclaimer.

(21) Appl. No.: 11/683,314

(22) Filed: Mar. 7, 2007

(65) Prior Publication Data
US 2008/0220788 A1    Sep. 11, 2008

(51) Int. Cl.
*H04W 4/00* (2009.01)
(52) U.S. Cl. ........................... 370/328; 370/338
(58) Field of Classification Search ............ 370/328, 370/329, 338
See application file for complete search history.

(56) References Cited

U.S. PATENT DOCUMENTS

| | | | |
|---|---|---|---|
| 6,081,697 A * | 6/2000 | Haartsen | 455/109 |
| 7,006,500 B1 | 2/2006 | Pedersen et al. | |
| 7,428,428 B2 * | 9/2008 | Wong et al. | 455/562.1 |
| 2001/0009857 A1 * | 7/2001 | Vanttinen | 455/456 |
| 2002/0044597 A1 * | 4/2002 | Shively et al. | 375/222 |
| 2003/0054810 A1 * | 3/2003 | Chen et al. | 455/422 |
| 2003/0190891 A1 * | 10/2003 | Ashkenazi | 455/62 |
| 2004/0203725 A1 * | 10/2004 | Lahav et al. | 455/423 |
| 2005/0088998 A1 * | 4/2005 | Douglas et al. | 370/338 |
| 2005/0163070 A1 * | 7/2005 | Farnham et al. | 370/328 |
| 2006/0153132 A1 * | 7/2006 | Saito | 370/329 |
| 2006/0189272 A1 * | 8/2006 | Willenegger et al. | 455/3.01 |
| 2006/0189352 A1 * | 8/2006 | Nagai et al. | 455/561 |

FOREIGN PATENT DOCUMENTS

| | | |
|---|---|---|
| EP | 1693994 A1 | 8/2006 |
| WO | WO 2004/028057 A2 | 4/2004 |
| WO | WO 2004/040424 A2 | 5/2004 |

* cited by examiner

*Primary Examiner* — Lester Kincaid
*Assistant Examiner* — Nathan Mitchell
(74) *Attorney, Agent, or Firm* — Volpe and Koenig, P.C.

(57) ABSTRACT

Multiple channels are aggregated. In an example embodiment, first data is transmitted on a first channel to a wireless device, and second data is simultaneously transmitted on a second channel to the wireless device. The first data and the second data are transmitted in a coordinated manner by aggregating the first channel and the second channel. Various example channel characteristics and combinations thereof are described. Different data allocation options for aggregated channels are described. Other alternative implementations are also presented herein.

16 Claims, 12 Drawing Sheets

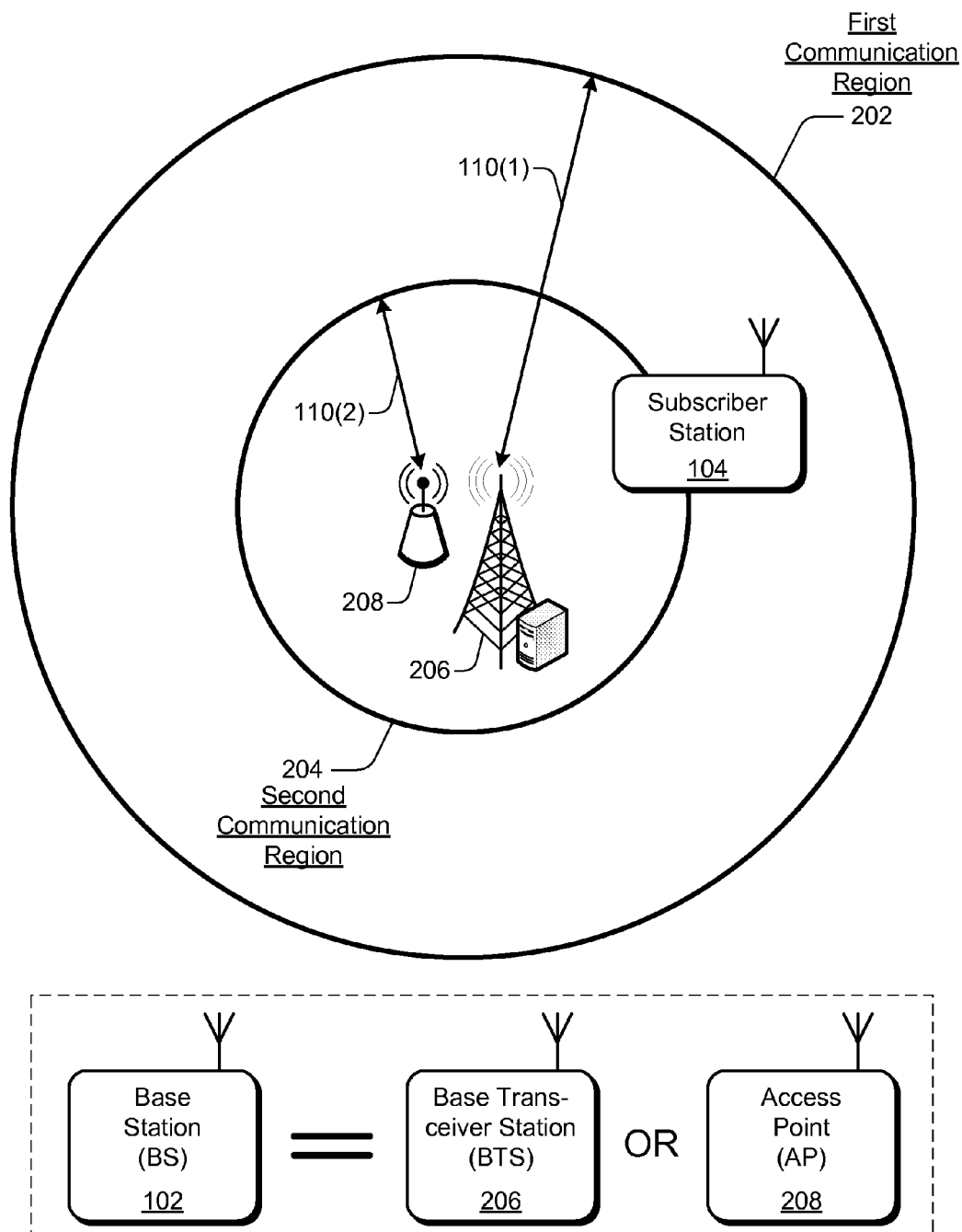
FIG. 2 — Multi-Communication Region Example

Example Base Station

Example Subscriber Station

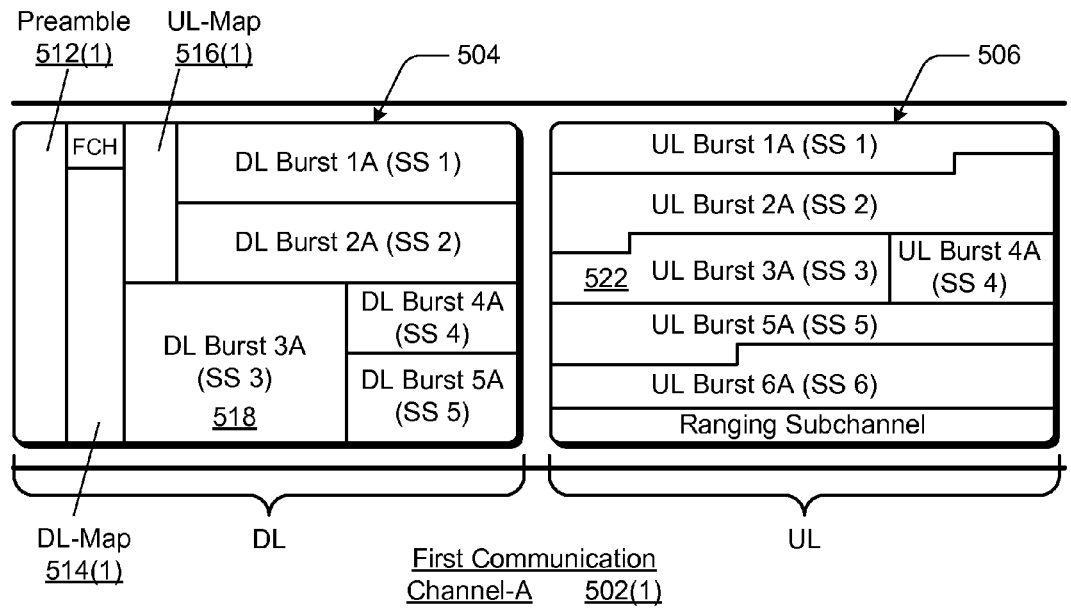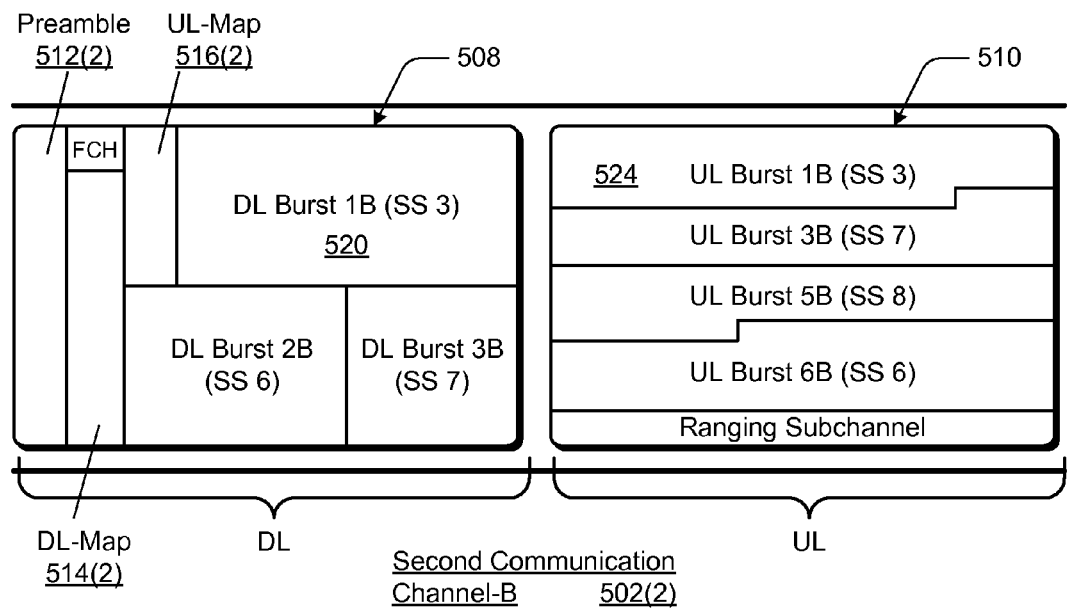
FIG. 5
Aggregated Communication Example

FIG. 6 Example of Data Allocation with Aggregated Channels

MULTI-BAND CHANNEL AGGREGATION

BACKGROUND

Wireless communication is a virtual necessity in today's society as people increasingly use cordless phones, cellular phones, wireless data communication devices, and the like on a daily basis. The ability to communicate wirelessly has become pervasive in homes, businesses, retail establishments, and in the outdoors generally. Consequently, people can now communicate while in transmit and in almost any environment.

Wireless communication involves the use of a limited resource: the electromagnetic spectrum. Different wireless communication schemes utilize different bands or segments of the electromagnetic spectrum in different manners. Typically, each particular segment of the electromagnetic spectrum is utilized in accordance with a wireless standard that has been created by a government entity, an industry consortium, and/or some other regulatory body.

There are many wireless standards under which wireless devices operate today. Example wireless standards include, but are not limited to, Bluetooth, Digital Enhanced Cordless Telecommunications (DECT), Code Division Multiple Access (CDMA)-2000, Wideband-CDMA (WCDMA), Orthogonal Frequency Division Multiple Access (OFDMA), Wi-Fi, WiMAX, and so forth. Wireless standards that have a marketing-oriented name typically also have a corresponding more technical name for the standard. For example, the term "Wi-Fi" is usually considered to correspond to at least the IEEE 802.11(a), (b), and (g) standards. Similarly, the term "WiMAX" is usually considered to correspond to at least a subset of the IEEE 802.16 standard.

A wireless communication device that operates in accordance with any one of these standards or another standard can generally receive and transmit electromagnetic signal waves that occupy a portion of the frequency spectrum. Wireless communication devices are generally designed to operate within a particular frequency band so as to avoid interfering with competing electromagnetic signal waves. Different frequency bands offer different advantages and disadvantages for wireless communication. For example, different frequency bands have different propagation and interference characteristics. Moreover, the various wireless standards, which generally correspond to an assigned frequency band or bands, provide for different propagation, interference-resistance, range, throughput, and other characteristics. Generally, no individual frequency band or wireless standard can be optimum for all communications in all situations.

SUMMARY

In an exemplary embodiment of the invention, first data is transmitted on a first channel to a wireless device. Second data is simultaneously transmitted on a second channel to the wireless device such that the first data and the second data are transmitted in a coordinated manner by aggregating the first channel and the second channel. The first channel and the second channel are located in different bands. Each of the first channel and the second channel is independently and properly formed so that another wireless device that is unable to support channel aggregation is capable of communicating by independently using one of the first channel or the second channel.

In another exemplary embodiment of the invention, respective data portions are directed toward respective ones of multiple channels based on respective characteristics of the multiple channels. The respective data portions are transmitted to a wireless device on the respective ones of the multiple channels such that the data portions are transmitted in a coordinated manner by aggregating the multiple channels. Each channel of the multiple channels is independently and properly formed so that another wireless device that is unable to support channel aggregation is capable of communicating by independently using one of the multiple channels.

In yet another exemplary embodiment of the invention, first data is directed toward a first channel based on a first characteristic of the first channel. Second data is directed toward a second channel based on a second characteristic of the second channel. The first data is transmitted to a wireless device on the first channel. The second data is simultaneously transmitted to the wireless device on the second channel such that the first data and the second data are transmitted in a coordinated manner by aggregating the first channel and the second channel. Each of the first channel and the second channel is independently and properly formed so that another wireless device that is unable to support channel aggregation is capable of communicating by independently using one of the first channel or the second channel.

However, other method, system, apparatus, device, media, procedure, arrangement, etc. embodiments for the invention are described herein.

BRIEF DESCRIPTION OF THE DRAWINGS

The same numbers are used throughout the drawings to reference like and/or corresponding aspects, features, and components.

FIG. 2 illustrates an example wireless environment including first and second communication regions that are associated with first and second communication channels, respectively.

FIG. 5 illustrates an exemplary depiction of communication frame structures for wireless communication via two aggregated communication channels for an embodiment of channel aggregation.

DETAILED DESCRIPTION

Channel Aggregation Introduction

Figure 1:
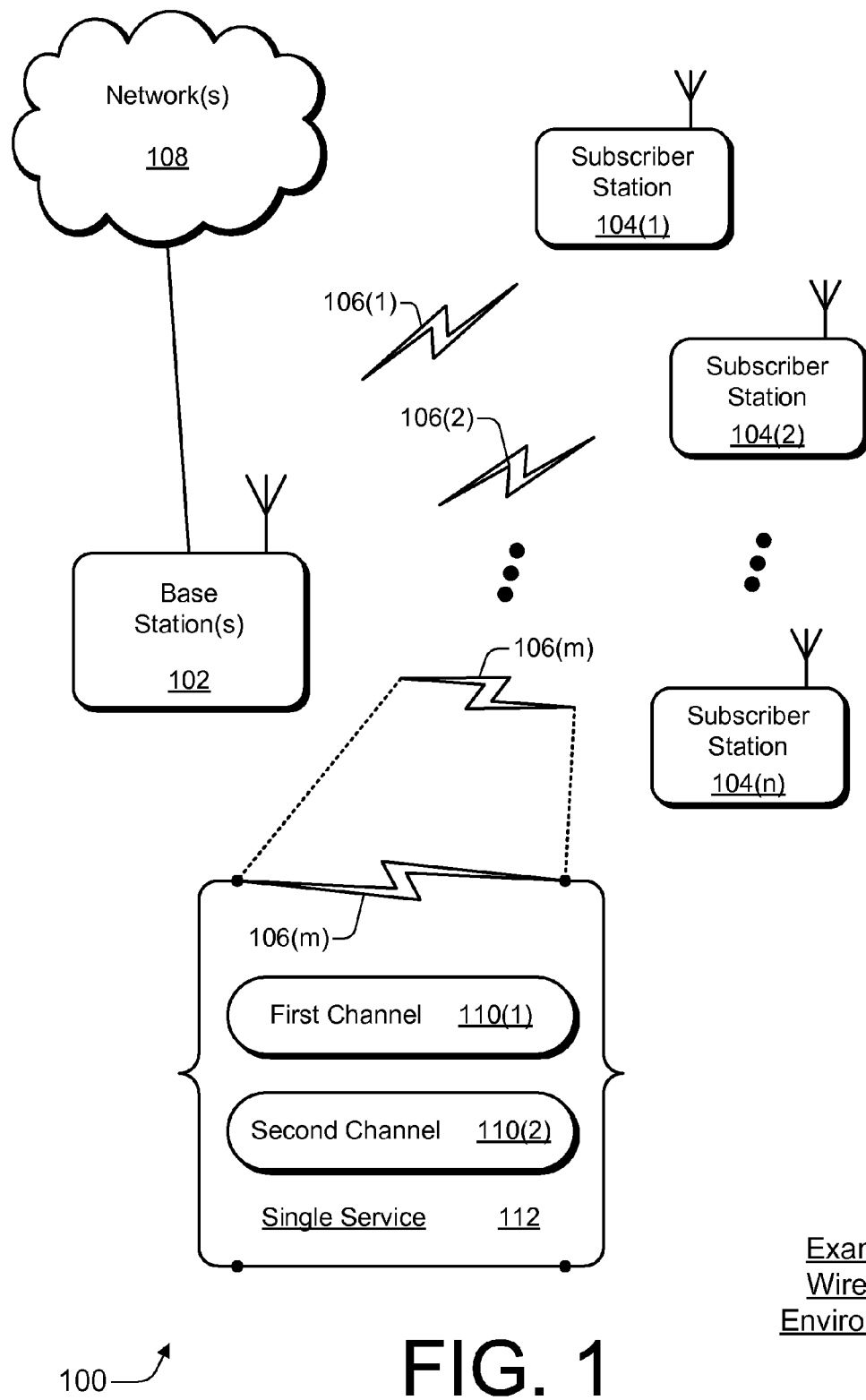
FIG. 1 is a block diagram of an example wireless environment having multiple wireless devices and multiple communication links, each of which may include first and second channels.

Channel aggregation is described for wireless communication in which exemplary embodiments provide that two or more communication channels can be channel-aggregated as communication channels, including for a single service. As described herein, channel aggregation may include transmitting and receiving data at a wireless communication device on different communication channels in which data from a single service may be assigned for communication on any one of two or more aggregated communication channels as determined by a channel aggregation system. The channel-aggregated communication channels are each individually properly formed communication channels. The channel-aggregated communication channels can be adjacent channels in the same frequency band or non-adjacent channels in the same or different frequency bands.

In an exemplary embodiment, a base station operable for channel-aggregated communication includes a scheduling module that (i) generates a first data set for communication via a first communication channel and (ii) generates a second data set for communication via a second communication channel, where the first data set and the second data set each include data intended for transmission to a particular subscriber station. The base station can also include a first radio to transmit the first data set to the subscriber station via the first communication channel and a second radio to transmit the second data set to the subscriber station via the second communication channel.

In another exemplary embodiment, a subscriber station operable for channel-aggregated communication includes a first radio to receive a first data set via a first communication channel, and it includes a second radio to receive a second data set via a second communication channel. The subscriber station can also include a receiving unit with a channel aggregation module that is capable of handling channel-aggregated communications. The channel aggregation module is to formulate an integrated data set for a single service from the first data set and the second data set.

In one particular example, two different communication channels can be a licensed communication channel and a non-exclusively-licensed communication channel. For example, a base station or base station system can be operable for channel-aggregated communication and implemented in a wireless communication system to transceive data via non-adjacent, channel-aggregated communication channels that include a licensed communication channel and a non-exclusively-licensed communication channel. Similarly, subscriber stations can each be operable for channel-aggregated communication and implemented in such a wireless communication system so as to transceive data via the licensed and the non-exclusively-licensed channel-aggregated communication channels.

Although features and concepts of the described systems, methods, devices, media, etc. for channel aggregation can be implemented in any number of different environments, communications systems, processing-based systems, structures, and/or other configurations, exemplary embodiments of channel aggregation are described in the context of the following example systems and environments.

Channel Aggregation Exemplary Embodiments

FIG. 1 is a block diagram of an example wireless environment 100 having multiple wireless devices 102 and 104 and multiple communication links 106, each of which may include first and second (or more) channels 110. As illustrated, wireless environment 100 includes a base station 102, one or more networks 108, "n" subscriber stations 104, and "m" communication links 106, with "n" and "m" being the same or different integers. Although a single respective communication link 106 is shown as being associated with each respective subscriber station 104, each subscriber station 104 may be simultaneously participating in multiple communication links 106. By way of example only, a respective first and second communication link 106 may correspond to a respective WiMAX and WiFi communication.

Wireless communications environment 100 is representative generally of many different types of wireless communications environments, including but not limited to those pertaining to wireless local area networks (wireless LANs) (e.g., Wi-Fi or WiMAX technology); wireless wide area networks (wireless WANs) (e.g., WiMAX technology); ad hoc wireless networks (e.g., Wi-Fi or Bluetooth technology); cellular technology (including so-called personal communication services (PCS)); trunking technology; metropolitan area networks (MANs), including hybrid or multi-use (e.g., WiMAX) technology; some combination thereof; and so forth.

In wireless communications environment 100, base station 102 is in wireless communication with subscriber stations 104(1), 104(2) . . . 104(n) via wireless communications or communication links 106(1), 106(2) . . . 106(m), respectively. Although implementations may vary, base station 102 is typically fixed, and subscriber stations 104 are usually mobile, nomadic, or stationary. Although wireless communications environment 100 depicts base station 102 as communicating with "n" subscriber stations 104 in one general direction, base station 102 may actually be communicating with any number of subscriber stations 104 in any number of directions, including in different sectors or omni-directionally.

As illustrated, base station 102 is capable of accessing network(s) 108. Network(s) 108 may be one or more of a wired network, another wireless network, a combination thereof, and so forth. Access to network 108 enables base station 102 to forward data from subscriber stations 104 to external network locations and vice versa. Network(s) 108 may also be used for backhaul purposes. Examples of network 108 include, by way of example but not imitation, the internet, a landline telephone network, another wireless network, wired nodes of the overall network of base station 102, LANs/WANs/MANs, some combination thereof, etc. that are operating in accordance with any given communication standard or standards.

Base station 102 may be, for example, a nexus point, a trunking radio, a switch or router, an access point, a traditional cellular base transceiver station, some combination and/or derivative thereof, and so forth. Subscriber stations 104 may be, for example, a hand-held device; a server, client, personal, desktop, and/or laptop computer; a wireless expansion card, module, adapter, or similar apparatus that is coupled to a computer or other device; a storage device; a set-top box or other television-related device; a personal digital assistant (PDA); a mobile phone or other mobile appliance; a vehicle having a wireless communication device; a tablet or hand/palm-sized computer; a wireless router; a node of a wireless mesh network; a portable inventory-related scanning device; any device capable of processing generally; some combination thereof; and so forth.

Base station 102 may interact with subscriber stations 104 in accordance with any individual or combined standardized and/or specialized air interface technologies. Example air interface technologies include, by way of example but not limitation, an IEEE 802.11 standard, an IEEE 802.16 standard, a draft IEEE 802.22 standard, various cellular phone standards, some combination or derivative thereof, or any other such technology. Applicable wireless schemes include, by way of example but not limitation, orthogonal frequency division multiple access (OFDMA) schemes, including both time division duplexing (TDD) and frequency division duplexing (FDD); orthogonal frequency division multiplexing (OFDM) schemes, including both TDD and FDD; time division-code division multiple access (TD-CDMA) schemes; general frequency division duplexing (FDD) schemes; single carrier (SC) schemes; time division multiplexing (TDM) schemes; some combination thereof; and so forth. Moreover, such schemes can include those requiring line of sight (LOS) communications as well as those allowing non-line of sight (NLOS) communications.

For an exemplary embodiment of channel aggregation, each wireless communication link 106 may be comprised of two or more aggregated (communication) channels 110. As illustrated in particular for wireless link 106(m), a single service 112 is being communicated using multiple aggregated channels 110. More specifically, a first channel 110(1) and a second channel 110(2) are channel-aggregated for communications via wireless link 106(m) for single service 112. Although only two channels 110(1) and 110(2) and a single service 112 are explicitly illustrated, channel aggregation may be implemented using any number of two or more communication channels and may involve more than one service. In an example embodiment, integrated data is divided into first data and second data. The first data is transmitted on a first channel. The second data is simultaneously transmitted on a second channel such that the first data and the second data are transmitted in a coordinated manner by aggregating the first channel and the second channel.

First and second aggregated channels 110(1) and 110(2) may each be any type of channel. They may also share none, one, many, or even all channel type characteristics. Example channel type characteristics include licensing, adjacency, frequency band, air interface technology, wireless scheme, transmit power, combination(s) thereof, and so forth. Thus, by way of example only, aggregated communication channels may be: licensed or non-exclusively-licensed channels, adjacent or non-adjacent channels, channels within different frequency bands or channels within the same frequency band, channels with the same or different wireless schemes, and so forth.

For a channel aggregation including a first communication channel 110(1) and a second communication channel 110(2), many combinations of different channel type characteristics may be implemented. By way of example only, the two aggregated channels 110(1) and 110(2) may be: [i] a licensed channel and a non-exclusively-licensed channel, [ii] two licensed channels in the same band, [iii] two licensed channels in different bands, [iv] two non-exclusively-licensed channels in the same band, [v] two non-exclusively-licensed channels in different bands, and so forth. If the two channels are within the same band, they may be adjacent or non-adjacent.

Phrased differently, two channel-aggregated communication channels 110 may be, by way of example only, one of the following seven [7] combinations: [1 and 2] adjacent, same band (either licensed (L) or non-exclusively-licensed (NEL), but not both); [3 and 4] non-adjacent, same band (either L or NEL, but not both); and [5, 6, and 7] non-adjacent, different bands (L and NEL, L and L, or NEL and NEL). Non-exclusively-licensed channels and bands include those that do not require an exclusive license for operation. Examples of non-exclusively-licensed channels and bands include, but are not limited to, those that are lightly-licensed, those that are licensed-exempt, and so forth.

Additionally, channel-aggregated communication channels can be made to appear as independent, properly formed channels such that so-called legacy devices can operate using any single communication channel as if communicating with a base station using a communication channel that is not channel-aggregated. Such legacy devices are not configured to understand and/or implement channel aggregation. However, if each channel-aggregated communication channel is independent and properly-formed, the legacy device can not only communicate with the base station that is implementing channel aggregation, but the legacy device may also actually communicate with the base station using any one of the aggregated channels. For example, a first channel and a second channel may be properly formed when a subscriber station that is unable to implement channel aggregation is capable of communicating using the first channel independently of the second channel.

For example, first and second communication channels may each be properly formed in accordance with a given wireless standard and/or wireless scheme. Additional examples include, but are not limited to: A particular communication channel may be considered properly formed when the channel is individually usable by and/or understandable to a legacy wireless device that is not designed to implement channel aggregation. Two aggregated communication channels may be considered properly formed if each includes an independent channel mapping. Also, two aggregated communication channels may be considered properly formed if there is a separate Fast Fourier Transform (FFT) for each aggregated channel. As another example, a properly-formed communication channel may entail including a preamble and/or one or more gaps (e.g., an uplink/downlink gap) in accordance with a wireless air interface technology standard and/or wireless scheme.

In an OFDMA wireless network, for instance, two aggregated channels that are properly formed in accordance with a given OFDMA wireless scheme have separate FFTs. In systems operating in accordance with an OFDMA scheme, each channel usually includes multiple subchannels, with each subchannel being comprised of multiple subcarriers. Channel aggregation may be implemented without using channels that are independent and properly formed if compatibility with legacy and other devices that do not implement channel aggregation is sacrificed. In such implementations, a single FFT can span two channels to thereby effectively bond them.

FIG. 2 illustrates an example wireless environment 200 including first and second communication regions 202 and 204 that are associated with first and second communication channels 110(1) and 110(2), respectively. As illustrated, wireless environment 200 includes a first communication region 202 and a second communication region 204. A first communication channel 110(1) is produced in the first communication region 202. A second communication channel 110(2) is produced in the second communication region 204.

Both first and second communication regions 202 and 204 are depicted as being substantially circular in shape and concentrically positioned. However, either or both regions may have an alternative shape, such as a sector, and concentric positioning need not be implemented. First communication region 202 is depicted as being larger than second communication region 204. However, either region may be larger, or each region may be the same size. Second communication region 204 is depicted as being contained within first communication region 202. However, either region may fully or only partially overlap the other. In fact, first and second communication regions 202 and 204 need not overlap significantly, if at all, as long as a subscriber station is capable of simultaneously communicating via first and second communication channels 110(1) and 110(2). Furthermore, a single base station 102 may be creating first and second communication regions 202 and 204 and may be transceiving first and second channel aggregated communications 110(1) and 110(2).

As specifically illustrated in FIG. 2, but by way of example only, a base station (BS) 102 may be realized as a base transceiver station (BTS) 206 or an access point (AP) 208. (As described herein above with particular reference to FIG. 1, a base station 102 may also be realized in other manners.) Implementations of base station 102 as a BTS 206 and an AP 208 are illustrated to describe a specific example.

In this specific example, a BTS 206 is associated with first communication region 202. BTS 206 produces first communication channel 110(1) and transceives via first communication channel 110(1). An AP 208 is associated with second communication region 204. AP 208 produces second communication channel 110(2) and transceives via second communication channel 110(2). A single subscriber station 104 may simultaneously communicate with AP 208 over second communication channel 110(2) and with BTS 206 over first communication channel 110(1) in a channel-aggregated scenario. Each of first and second aggregated communication channels 110(1) and 110(2) are properly-formed such that a wireless device that is unable to understand and/or interoperate with channel aggregation can still share either of first communication channel 110(1) or second communication channel 110(2).

In a particular exemplary embodiment, first communication region 202 is designated for licensed communications, and second communication region 204 is designated for non-exclusively-licensed communications. Hence, in such an embodiment, first communication channel 110(1) may be part of a licensed communication band, and second communication channel 110(2) may be part of a non-exclusively-licensed communication band. More detailed exemplary embodiments involving licensed and non-exclusively-licensed channel-aggregated communications are described herein below with particular reference to FIGS. 10 and 11.

Figure 3A:
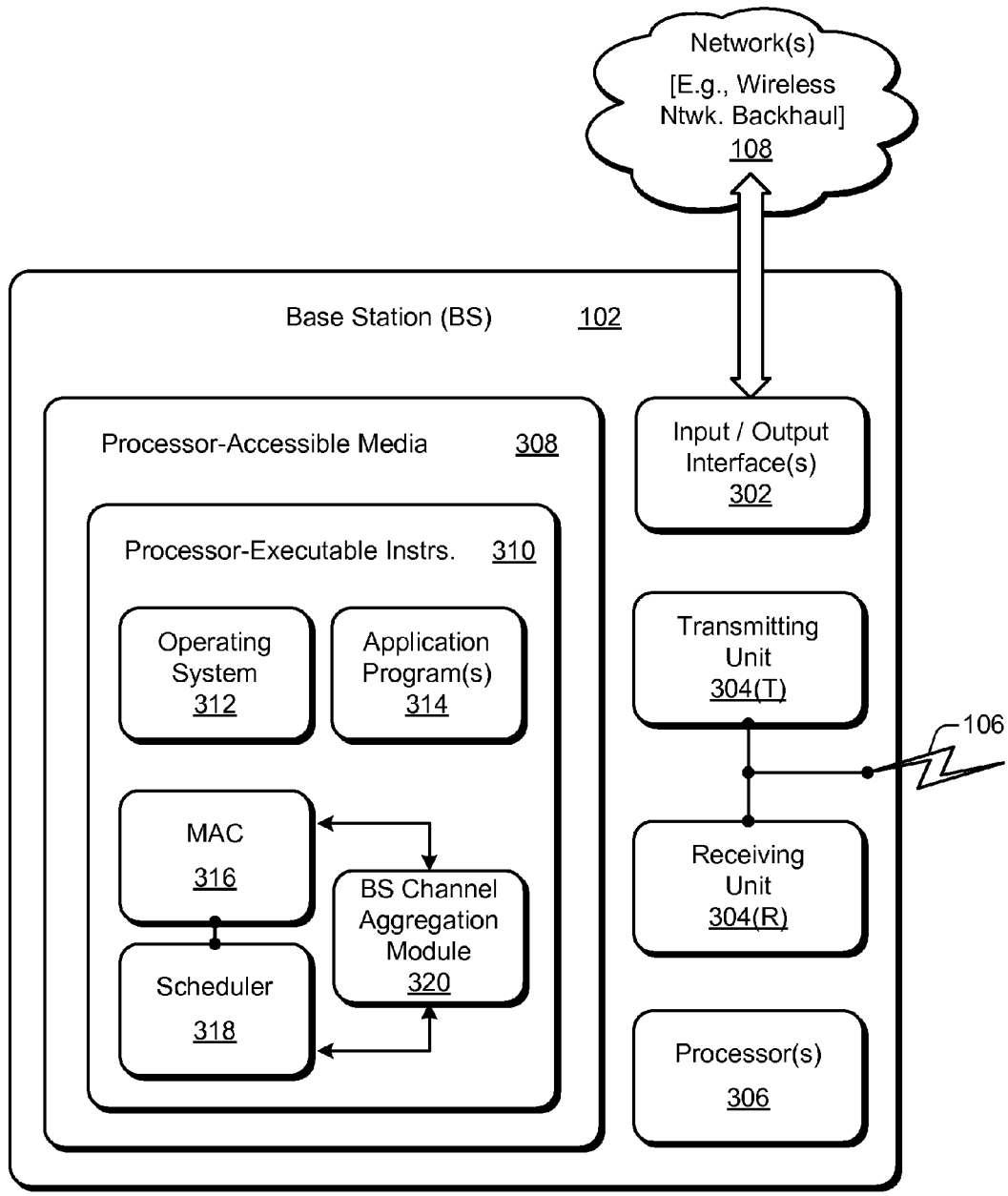
FIGS. 3A and 3B illustrate example wireless communication devices including a base station and a subscriber station, respectively, which can be utilized to implement embodiments of channel aggregation.
Figure 3B:
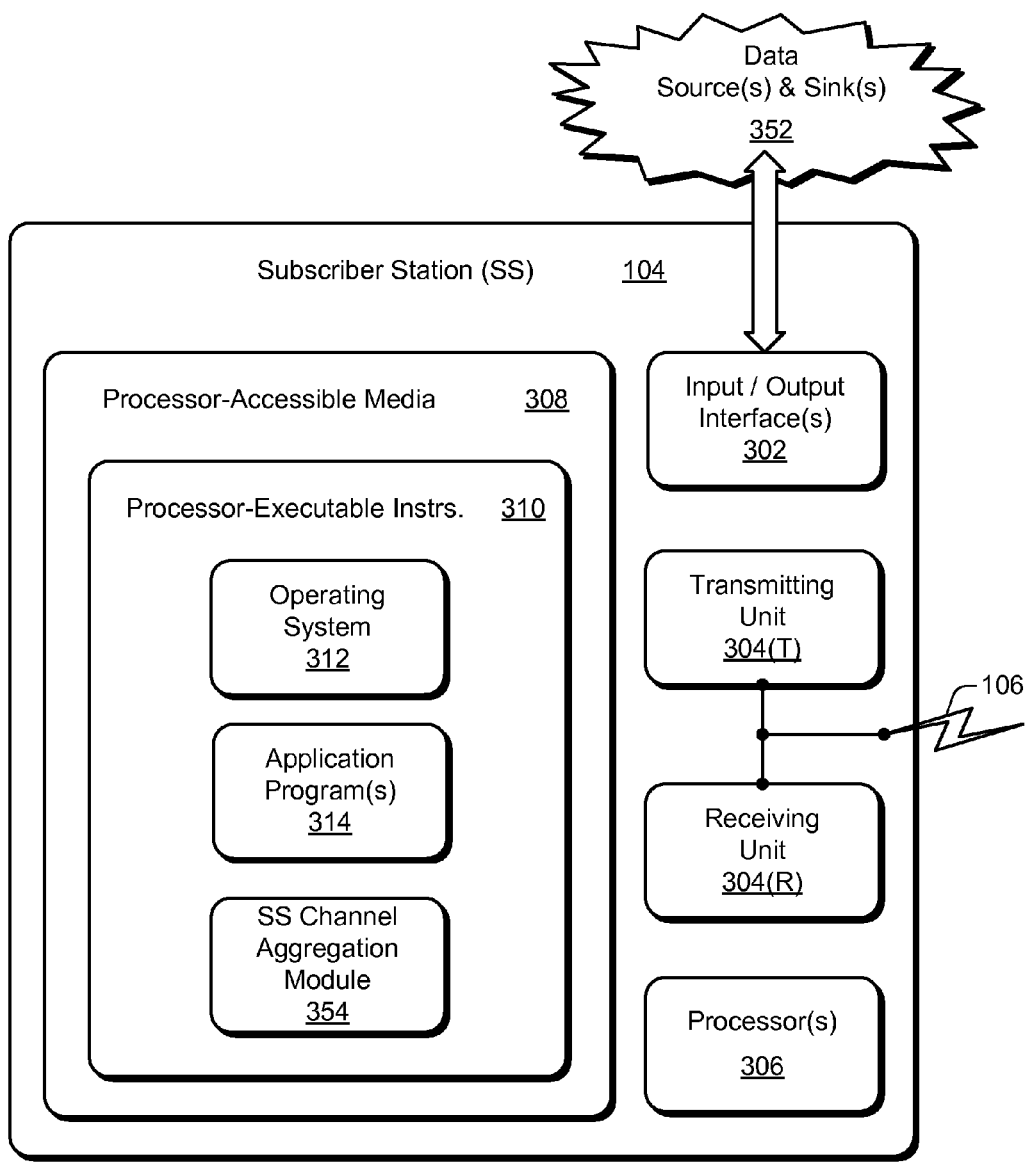

FIGS. 3A and 3B illustrate example wireless communication devices including a base station 102 and a subscriber station 104, respectively, which can be utilized to implement embodiments of channel aggregation. Base station 102 and subscriber station 104 may be considered wireless communication devices generally. As illustrated, each of base station 102 and subscriber station 104 include one or more input/output (I/O) interfaces 302, at least one transceiving unit 304, at least one processor 306, and one or more processor-accessible media 308. Media 308 includes processor-executable instructions 310, examples of which may include, but are not limited to, an operating system 312 and one or more application programs 314.

In a described implementation, I/O interfaces 302 enable communication through wired media and/or a (e.g., secondary) wireless interface. Generally, processor 306 is capable of executing, performing, and/or otherwise effectuating processor-executable instructions, such as processor-executable instructions 310. Media 308 is comprised of one or more processor-accessible media. In other words, media 308 may include processor-executable instructions 310 that are executable by processor 306 to effectuate the performance of functions by base station 102 or subscriber station 104.

Thus, realizations for channel aggregation may be described in the general context of processor-executable instructions. Generally, processor-executable instructions include programs, applications, coding, modules, objects, interfaces, components, data structures, etc. that perform and/or enable particular tasks and/or implement particular abstract data types. Processor-executable instructions may be located in separate storage media, executed by different processors, and/or propagated over or extant on various transmission media. Moreover, processor-executable instructions may be embodied as software, firmware, hardware, fixed logic circuitry, some combination thereof, and so forth.

Processor(s) 306 (e.g., any of microprocessors, controllers, etc.) may be implemented using any applicable processing-capable technology. Media 308 may be any available media that is included as part of and/or accessible by base station 102 or subscriber station 104. It includes volatile and non-volatile media, removable and non-removable media, storage and transmission media (e.g., wireless or wired communication channels), hard-coded logic media (e.g., an application-specific integrated circuit (ASIC), a field programmable gate-array (FPGA), etc.), and so forth. Media 308 is tangible media when it is embodied as a manufacture and/or a composition of matter. By way of example only, media 308 may include an array of disks or flash memory for longer-term mass storage of processor-executable instructions, random access memory (RAM) for shorter-term storing of instructions that are currently being executed and/or otherwise processed, link(s) on networks for transmitting communications, and so forth.

FIG. 3A illustrates an example base station 102. With base station 102, I/O interfaces 302 provide access to other networks, such as network(s) 108 (of FIG. 1). Network 108 may be a backhaul network for the wireless network. Base station 102 also includes a transmitting unit 304(T) and/or a receiving unit 304(R), which may be termed a transceiving unit 304 (not separately shown). Transceiving unit 304 enables base station 102 to communicate wirelessly via communication links 106. Transmitting unit 304(T) and receiving unit 304(R) may include one or more, and usually multiple, transmitters or receivers, respectively, and/or one or more transmitting chains or receiving chains. Each transmitter and receiver may include one or more radios (not explicitly shown) that are dedicated or shared.

With base station 102, processor-executable instructions 310 are illustrated as including a medium access controller (MAC) 316, a scheduler 318, and a BS channel aggregation module 320. In a described implementation, MAC 316 plans, orders, regulates, and otherwise controls access to the wireless medium. Scheduler 318 interacts with a quality of service (QoS) engine (not shown) to determine which services are due some portion of the available bandwidth of the wireless medium. Scheduler 318 may be part of MAC 316. Different implementations having a single MAC or multiple MACs are described herein below with particular reference to FIG. 4.

BS channel aggregation module 320 is responsible for the functions that enable implementation of channel aggregation for two or more channels. In manners that are apparent from the description herein, BS channel aggregation module 320 interacts with MAC 316 and/or scheduler 318 in the performance of some of these channel aggregation functions. For example, during transmission, the division of data between two different aggregated communication channels is determined. During reception, data received on two different aggregated communication channels is recombined into joint or integrated data, perhaps for a single service.

BS channel aggregation module 320 is also at least partially responsible for announcing that base station 102 is capable of aggregating two or more channels. For example, this announcement may be in the form of a general broadcast throughout its associated communication region. Alternatively, the announcing may be in the form of a capabilities negotiation with individual subscriber stations, especially with those that indicate they are capable of channel aggregation.

FIG. 3B illustrates an example subscriber station 104. With subscriber station 104, I/O interfaces 302 provide access through ingress and/or egress ports to data source(s) and/or sink(s) 352. Data sources and sinks 352 may include, for example, a local processing device or memory, a man-machine interface (e.g., keyboard/keypad, speaker, microphone, etc.), a network connection, and so forth. Hence, I/O interfaces 302 for subscriber station 104 may be any one or more of a serial and/or parallel interface, a universal serial bus (USB) interface, a wireless interface, a network interface, or any other type of interface for external communication. Examples include, by way of example but not limitation, a network interface card (NIC), a modem, one or more network ports, some combination thereof, and so forth.

Subscriber station 104 also includes a transmitting unit 304(T) and/or a receiving unit 304(R), which may be termed a transceiving unit 304 (not separately shown). Transceiving unit 304 enables subscriber station 104 to communicate wirelessly via communication links 106. Transmitting unit 304(T) and receiving unit 304(R) may include one or more transmitters or receivers, respectively, and/or one or more transmitting chains or receiving chains. Having multiple (e.g., at least two) receiving chains and transmitting chains enables a subscriber station 104 to participate in a channel-aggregated wireless communication. Each transmitter and receiver may include one or more radios (not explicitly shown) that are dedicated or shared.

With subscriber station 104, processor-executable instructions 310 are illustrated as including a SS channel aggregation module 354. In a described implementation, SS channel aggregation module 354 is at least partially responsible for handling channel aggregated communications and performing the SS-side functions of channel aggregation as described herein. For example, SS channel aggregation module 354 is capable of dividing data over aggregated channels during transmission and combining data into joint or integrated data from two or more aggregated channels during reception. Although not so illustrated specifically, a subscriber station 104 may also include a MAC and/or a scheduler.

SS channel aggregation module 354 is also capable of requesting or accepting channel aggregated communications with a base station. For example, SS channel aggregation module 354 may detect a broadcast notification that a given base station is capable of implementing channel aggregation. Also, SS channel aggregation module 354 may notify a base station of a channel-aggregating capability during a capabilities negotiation.

Figures 4A, 4B:
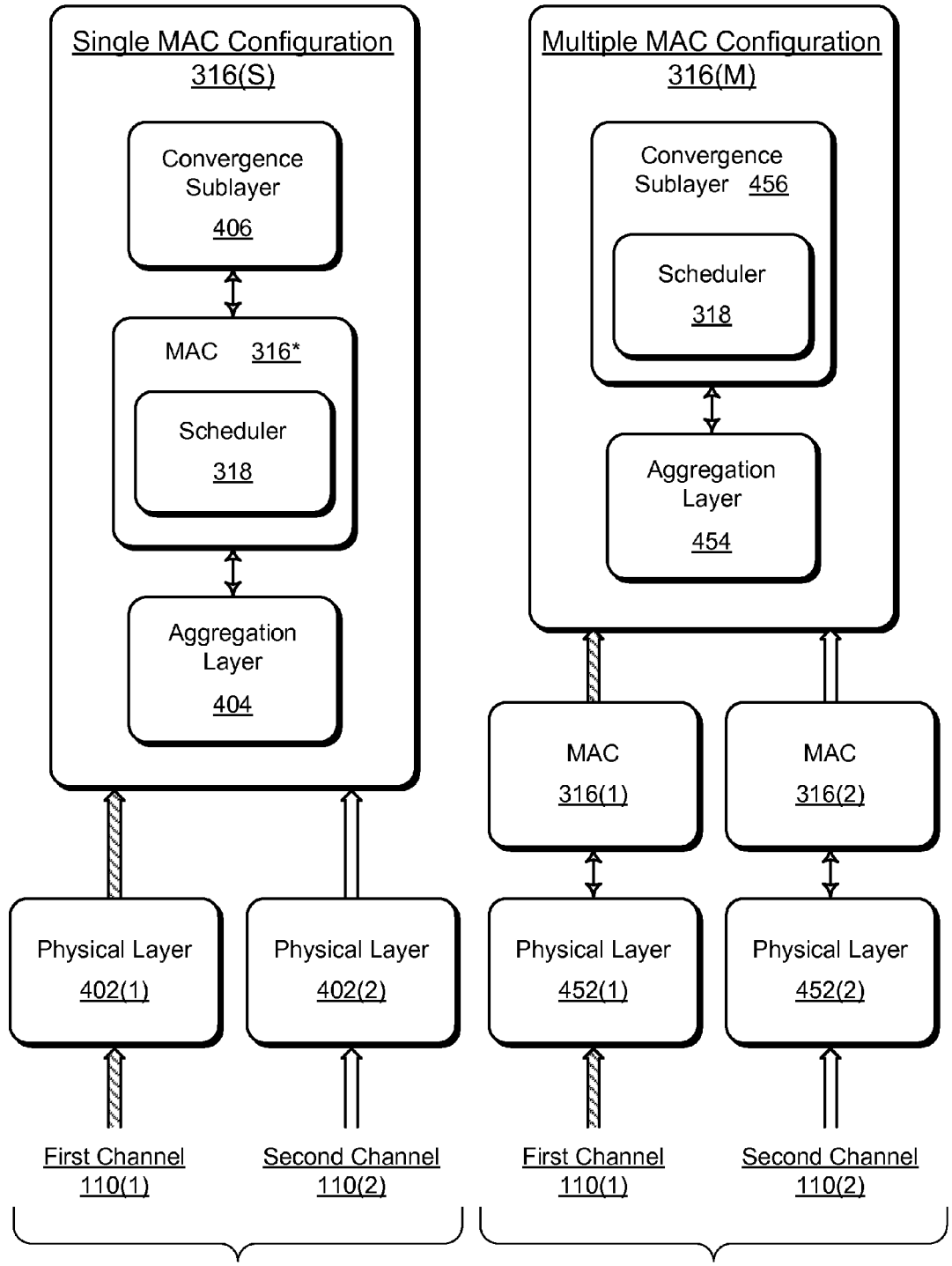
FIGS. 4A and 4B illustrate various components of an example base station, such as the one shown in FIG. 3A, that can be configured with a single MAC (FIG. 4A) or multiple MACs (FIG. 4B).

FIGS. 4A and 4B illustrate various components of an example base station, such as the one shown in FIG. 3A, that can be configured with a single MAC (FIG. 4A) or multiple MACs (FIG. 4B). A single MAC configuration 316(S) is illustrated in FIG. 4A. A multiple MAC configuration 316(M) is illustrated in FIG. 4B. Each of the illustrated boxes may represent modules and/or applications of processor-executable instructions 310.

Single MAC configuration 316(S) includes independent physical layers 402(1) and 402(2) for first aggregated channel 110(1) and second aggregated channel 110(2), respectively. A physical layer 402 can include various components, such as a transceiving unit 304 (of FIG. 3), filtering components, and other components to receive and transmit wireless data. Single MAC configuration 316(S) also includes an aggregation layer 404, a convergence sublayer 406, and a single MAC 316*. In this single MAC configuration, MAC 316* can include scheduler 318.

In single MAC configuration 316(S), the single MAC 316* is implemented to map the data to the physical resources or to respond to requests by the base station in the uplink. This typically involves an awareness of QoS, destination, state of the physical resources, and so forth. It should be understood that the term "single MAC" refers to two or more channels 110/physical layers 402 in a particular channel-aggregation; a given base station may implement a single MAC configuration 316(S) repeatedly for different sectors, different frequency bands, and so forth.

Multiple MAC configuration 316(M) includes independent physical layers 452(1) and 452(2) for first aggregated channel 110(1) and second aggregated channel 110(2), respectively. Multiple MAC configuration 316(M) also includes a respective independent MAC 316(1) and 316(2) corresponding to each respective physical layer 452(1) and 452(2). The multiple MAC configuration also includes an aggregation layer 454 and a convergence sublayer 456, which includes scheduler 318. In multiple MAC configuration 316(M), MACs 316(1) and 316(2) are implemented to perform many of the same functions as the single MAC 316*. It should be understood that scheduler 318 need not be moved out of the MACs 316(1) and 316(2) to implement multiple MAC configuration 316(M). In fact, scheduler 318 is moved to convergence sublayer 456 if a single service is to be split across multiple physical layers 452. If the split is to be performed on a per-service basis rather than on a per-packet basis, scheduler 318 is located in each MAC 316(1) and 316(2) and convergence sublayer 456 then directs the packets for a particular service to a particular MAC 316(1) or 316(2) without truly "scheduling" them.

However, because the decision regarding what channel a packet is transmitted on has already been made (e.g., at convergence sublayer 456) in multiple MAC configuration 316(M), independent MACs 316(1) and 316(2) do not perform that aspect of scheduling. In other words, with multiple MAC configuration 316(M), some aspects of scheduling are performed at convergence sublayer 456 while other scheduling aspects are performed at MACs 316. Consequently, independent MACs 316(1) and 316(2) cannot be creative regarding the routing of data based on QoS. This occurs in the convergence sublayer/aggregation modules. It also means that sending automatic retransmit request (ARQ) retries or ACKs on a different channel is not feasible with independent MACs 316(1) and 316(2). In short, with multiple MAC configuration 316(M), some of the complexity of scheduling is split between convergence sublayer 456 and MACs 316(1) and 316(2) at the expense of features/flexibility. For example, with multiple MAC configuration 316(M), a single service cannot easily be split between the two physical layers 452(1) and 452(2).

One skilled in the art would understand how to implement layers 402, 404, and 406 (and corresponding layers 452, 454, and 456 of FIG. 4B) as well as the overall single MAC configuration 316(S) (and multiple MAC configuration 316(M)) in view of the descriptions and teachings herein. Nevertheless, abbreviated descriptions of the aggregation layer and the convergence sublayer are provided below.

Aggregation layer 404/454 is relatively thin. It directs the data to/from the correct channel. In single MAC configuration 316(S), aggregation layer 404 is the realization of arrows 614 between the burst construction queues 606/608/610 and the subframe structures 504/508 in FIG. 6, which is described herein below. Convergence sublayer 406/456 determines which subscriber station a packet goes to and on which connection. The next layer down then uses that determination to perform its function. In single MAC configuration 316(S), convergence sublayer 406 passes its information to MAC 316* for scheduling at scheduler 318. In multiple MAC configuration 316(M), convergence sublayer 456 passes its information to the correct MAC 316(1) or 316(2).

FIG. 5 illustrates an exemplary depiction of communication frame structures 504, 506, 508, and 510 for wireless communication via two aggregated communication channels 502(1) and 502(2) for an embodiment of channel aggregation. First and second communication channels 502(1) and 502(2) are specific examples of general first and second communication channels 110(1) and 110(2) (of FIG. 1). First aggregated communication channel-A 502(1) includes a downlink (DL) subframe 504 and an uplink (UL) subframe 506. Second aggregated communication channel-B 502(2) includes a DL subframe 508 and an UL subframe 510.

Wireless data for communication with various subscriber stations 1-8 (SS 1-SS 8) can be tiled for OFDMA to define a relationship between two frames that are transmitted simultaneously on the two aggregated communication channels 502(1) and 502(2). In this example, data for subscriber stations 3 and 6 (SS 3 and SS 6) are enabled for channel aggregated operation, and data for the other subscriber stations (i.e., SS 1, 2, 4, 5, 7, and 8) are enabled for single channel operation. Although the illustrated frame structures comport with an IEEE 802.16(e) wireless standard implementing TDD OFDMA, the principles are applicable to other air interface technologies and wireless schemes.

In addition to downlink data for the subscriber stations 1-8 (SS 1-8), DL subframes 504 and 508 each include respective preambles 512(1) and 512(2), respective DL maps 514(1) and 514(2), and respective UL maps 516(1) and 516(2). In addition to uplink data for the subscriber stations 1-8 (SS 1-8), UL subframes 506 and 510 each include a ranging subchannel. Each data burst shown in the subframe structures may contain one or more data packets and/or data packet fragments.

Subscriber station 3 (SS 3) is associated with a number of bursts in subframes 504, 506, 508, and 510. First aggregated communication channel-A 502(1) includes downlink data for subscriber station 3 (SS 3) at "DL Burst 3A", as indicated at 518. Second aggregated communication channel-B 502(2) includes downlink data for subscriber station 3 (SS 3) at "DL Burst 1B", as indicated at 520. First aggregated communication channel-A 502(1) includes uplink data from subscriber station 3 (SS 3) at "UL Burst 3A", as indicated at 522. Second aggregated communication channel-B 502(2) includes uplink data from subscriber station 3 (SS 3) at "UL Burst 1B", as indicated at 524.

Channel aggregation modules 320 and 354 (of FIGS. 3A and 3B) are responsible for dividing integrated data into two or more sets that are being transmitted across two or more aggregated channels and for combining the data sets that are being received via the two or more aggregated channels into the integrated data. For example, integrated data for subscribe station 3 (SS3) is divided into first data of "DL Burst 3A" 518 and second data "DL Burst 1B" 520 at a base station. At subscriber station 3, the first data of "DL Burst 3A" and the second data of "DL Burst 1B" are combined into the integrated data.

As illustrated in FIG. 5, there can be substantial variability in the mapping of data due to the nature of data traffic, such as IP data traffic. For instance, some subscriber stations may not receive data in every frame, or they may have asymmetric uplink and downlink needs, not only on the average, but also instantaneously on a frame by frame basis. Moreover, there is an additional variability caused by changing parameters at the physical layer. For example, the same data amount may take more or less absolute bandwidth from time to time as conditions of the physical layer vary as a result of how these conditions can impact available modulation and coding rate options. Base station 102 schedules the bandwidth taking this into account by scheduling the transmission of actual data in the downlink and by scheduling logical demand in the uplink.

FIG. 5 illustrates an example for how channel aggregation may be implemented in an IEEE 802.16 OFDMA-based system that is operating with a TDD mechanism. However, a FDD mechanism is also effective in an OFDMA system. Moreover, channel aggregation as described herein can be applied to SC, TD-CDMA, and other wireless communication schemes that are identified herein.

Figure 6:
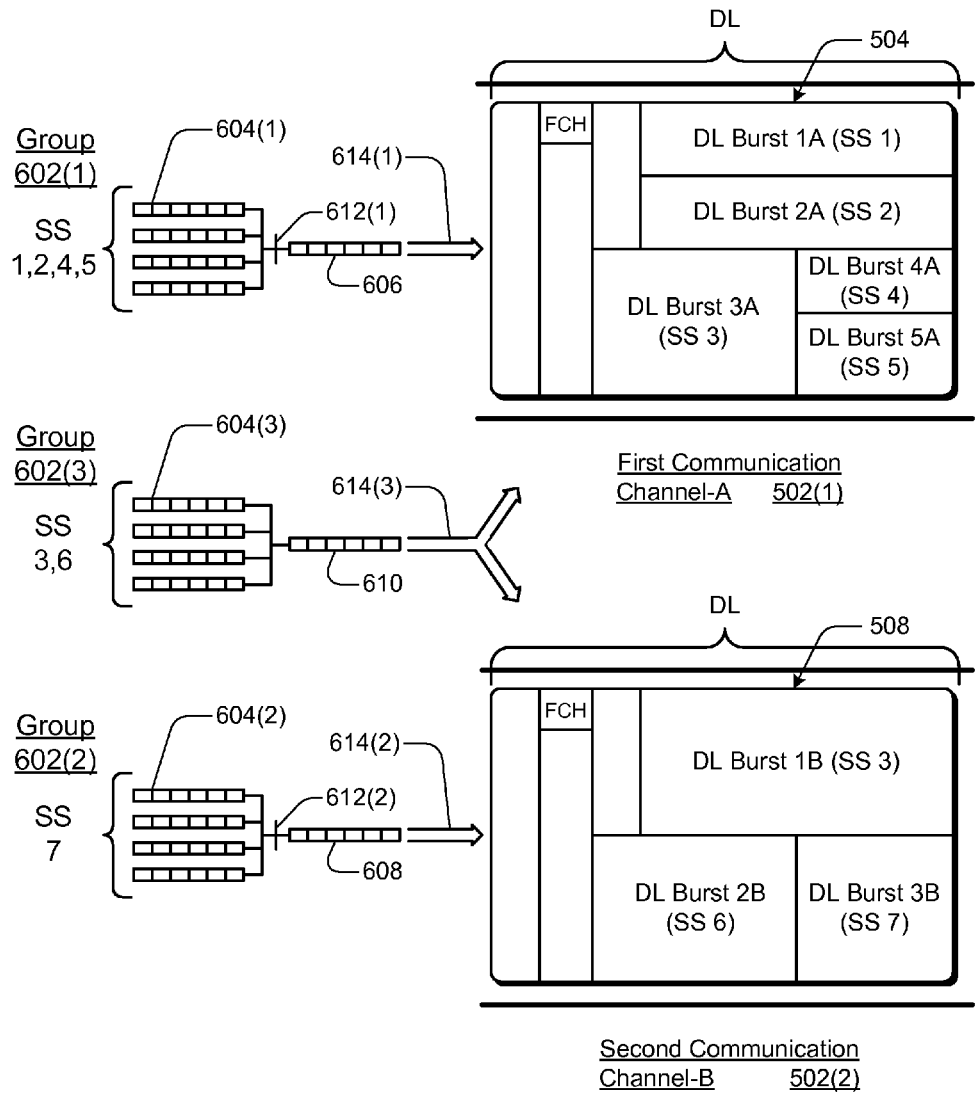
FIG. 6 illustrates an example of forming data bursts in downlink subframes via two aggregated communication channels in an embodiment of channel aggregation.

FIG. 6 illustrates an example 600 of forming data bursts in downlink subframes 504 and 508 via two aggregated communication channels 502(1) and 502(2) in an embodiment of channel aggregation. In this illustrated example of data burst formation 600, scheduler 318 (of FIG. 3) divides the subscriber stations 1-8 (SS 1-8) into three groups 602(1, 2, 3). Group 602(1) includes those subscriber stations (e.g., SS 1, 2, 4, and 5) that are implemented only for single channel operation and that have accessed the network on first communication channel 502(1). Group 602(2) includes those subscriber stations (e.g., SS 7) that are implemented only for single channel operation and that have accessed the network on second communication channel 502(2).

Group 602(3) includes those subscriber stations (e.g., SS 3 and 6) that are currently operable for channel aggregated operation on both first and second communication channels 502(1) and 502(2). In this example, first communication channel 502(1) may therefore be considered to be functioning as a standard single communication channel with respect to subscriber stations 1, 2, 4, and 5 but as a aggregated communication channel with respect to subscriber stations 3 and 6.

Data for the three separate groups 602(1, 2, and 3) of subscriber stations have respective separate class queues 604 (1, 2, and 3). These class queues 604 may be part of a QoS engine (not shown) that is associated with scheduler 318 of MAC 316 (all of FIG. 3A). The QoS engine runs initially over the three groups of queues 604(1-3) to extract data based on at least one fairness algorithm that has been implemented. In this example, data from group 602(1) is allocated/directed from burst construction queue 606 to first single communication channel 502(1) at aggregation layer arrow 614(1), and data from group 602(2) is allocated/directed from burst construction queue 608 to second single communication channel 502(2) at aggregation layer arrow 614(2). Data from group 602(3) can be allocated/directed from burst construction queue 610 to either one or a combination of first and second aggregated communication channels 502(1) and 502(2) at aggregation layer arrow 614(3).

If the downlink subframe 504 or 508 for either of the first and second communication channels 502(1) or 502(2) is individually fully allocated before the combination of communication channels 502(1) and 502(2) has been fully allocated, the QoS engine or scheduler 318 closes a gate 612(1) or 612(2) for the group 602(1) or 602(2), respectively, that corresponds to the communication channel 502(1) or 502(2) having a fully-allocated DL subframe. The QoS engine can continue allocating until the combination of data from all three groups 602(1-3) fills both communication channels 502, or until the time limit for filling the frame has expired. The result is a DL subframe 504 with data from group 602(1) in first communication channel 502(1) and a DL subframe 508 with data from group 602(2) in second communication channel 502(2). Both DL subframe 504 and DL subframe 508 may have data from group 602(3) because the data in class queue 604(3) is distributed over both first communication channel 502(1) and second communication channel 502(2).

Figure 7:
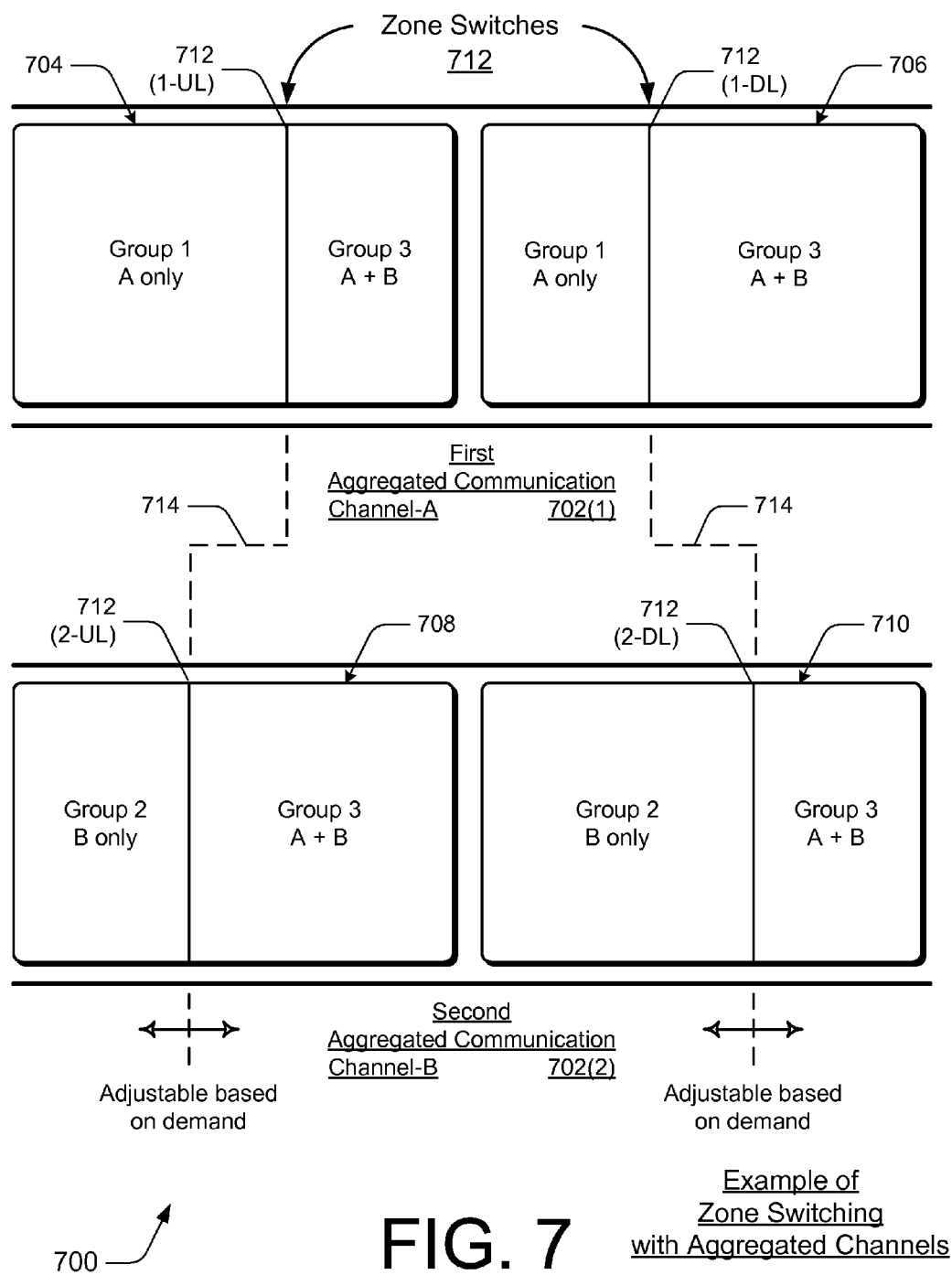
FIG. 7 illustrates an example of zone switching within subframes for wireless communication via two aggregated communication channels for an embodiment of channel aggregation.

FIG. 7 illustrates an example of zone switching 700 within subframes 704, 706, 708, and 710 for wireless communication via two aggregated communication channels 702 for an embodiment of channel aggregation. First aggregated communication channel-A 702(1) includes a DL subframe 704 and an UL subframe 706. Second aggregated communication channel-B 702(2) includes a DL subframe 708 and an UL subframe 710. First and second aggregated communication channels 702(1) and 702(2) are specific examples of general first and second communication channels 110(1) and 110(2) (of FIG. 1).

Although not required to implement channel aggregation, zone switching 700 may be employed in conjunction with two or more aggregated communication channels 702 to form a clear demarcation between zones with channel aggregation and zones without. Thus, in a described implementation, a new zone definition provides that the DL and UL subframes can be segregated into zones that are channel aggregated and zones that are not. For example, zone switches 712 are shown in first aggregated communication channel-A 702(1) and second aggregated communication channel-B 702(2).

As illustrated, there are three groups: Group 1 (channel A only), Group 2 (channel B only), and Group 3 (channels A and B), with Group 3 corresponding to the channel-aggregated zones. Zone switch 712(1-UL) segregates UL subframe 704 of first aggregated communication channel-A 702(1) into a Group 1 zone and a Group 3 zone. Zone switch 712(1-DL) segregates DL subframe 706 of first aggregated communication channel-A 702(1) into a Group 1 zone and a Group 3 zone. Zone switch 712(2-UL) segregates UL subframe 708 of second aggregated communication channel-B 702(2) into a Group 2 zone and a Group 3 zone. Zone switch 712(2-DL) segregates DL subframe 710 of second aggregated communication channel-B 702(2) into a Group 2 zone and a Group 3 zone.

As shown by dashed lines 714, the zone switches 712 may occur at different times (or frequencies) in each subframe on each communication channel 702. Also, the temporal (or frequency) location of the zone switches may be adjusted based on demand. For example, zone switching 700 can be adjusted frame to frame based on the relative demand and QoS constraints of data traffic between channel aggregation and non-channel aggregation subscriber stations. Although not so illustrated, the channel-aggregated zone or zones can precede the non-channel-aggregated zone or zones in any or all of the subframes. Moreover, there can be more or less than the two zones illustrated, and there can be different numbers of zones (including one/none) in different subframes of the same channel or aggregated channels. Furthermore, zone segregation can be performed along a temporal dimension and/or a frequency dimension (e.g., using sets of subcarriers).

Figure 8:
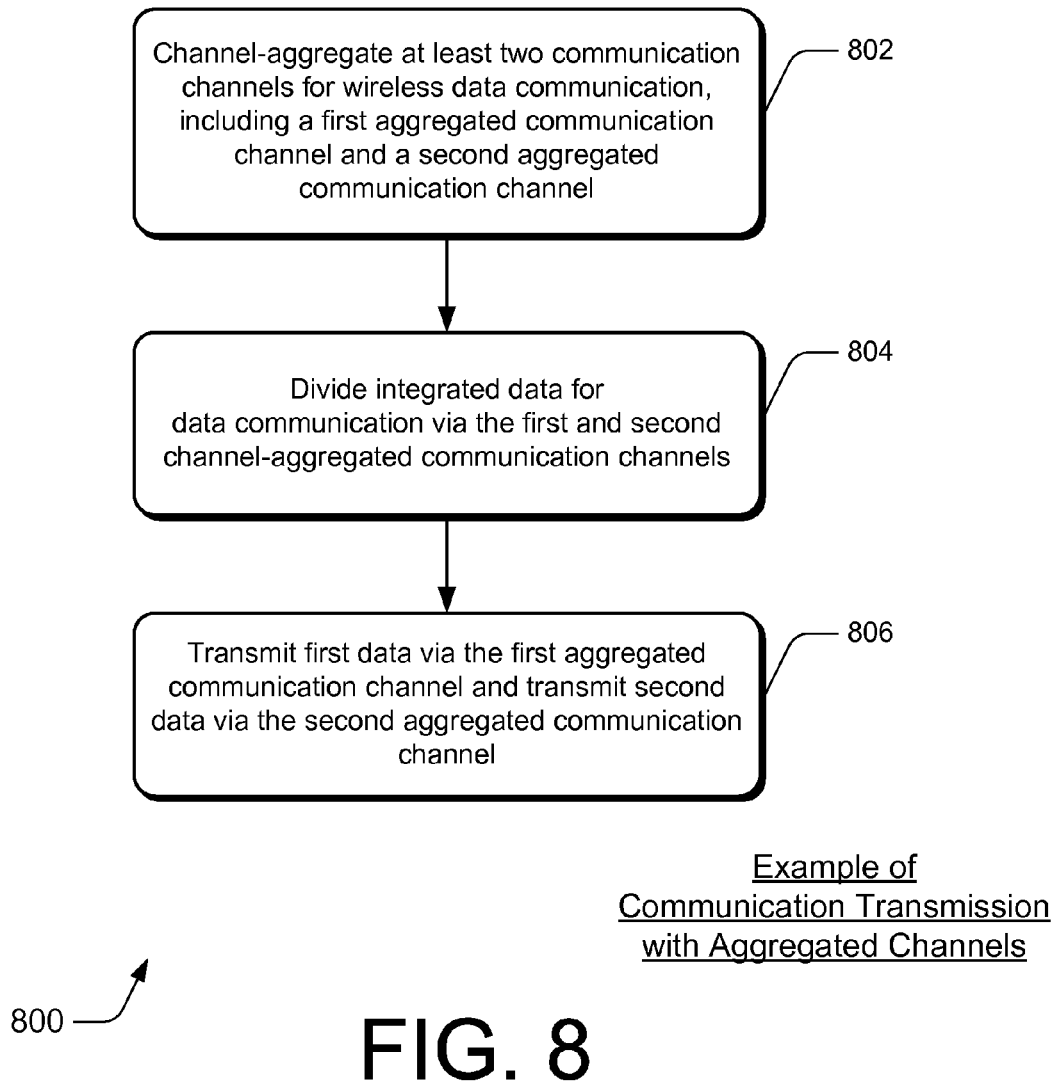
FIG. 8 is a flow diagram that illustrates an example method for communication transmission using channel aggregation.
Figure 9:
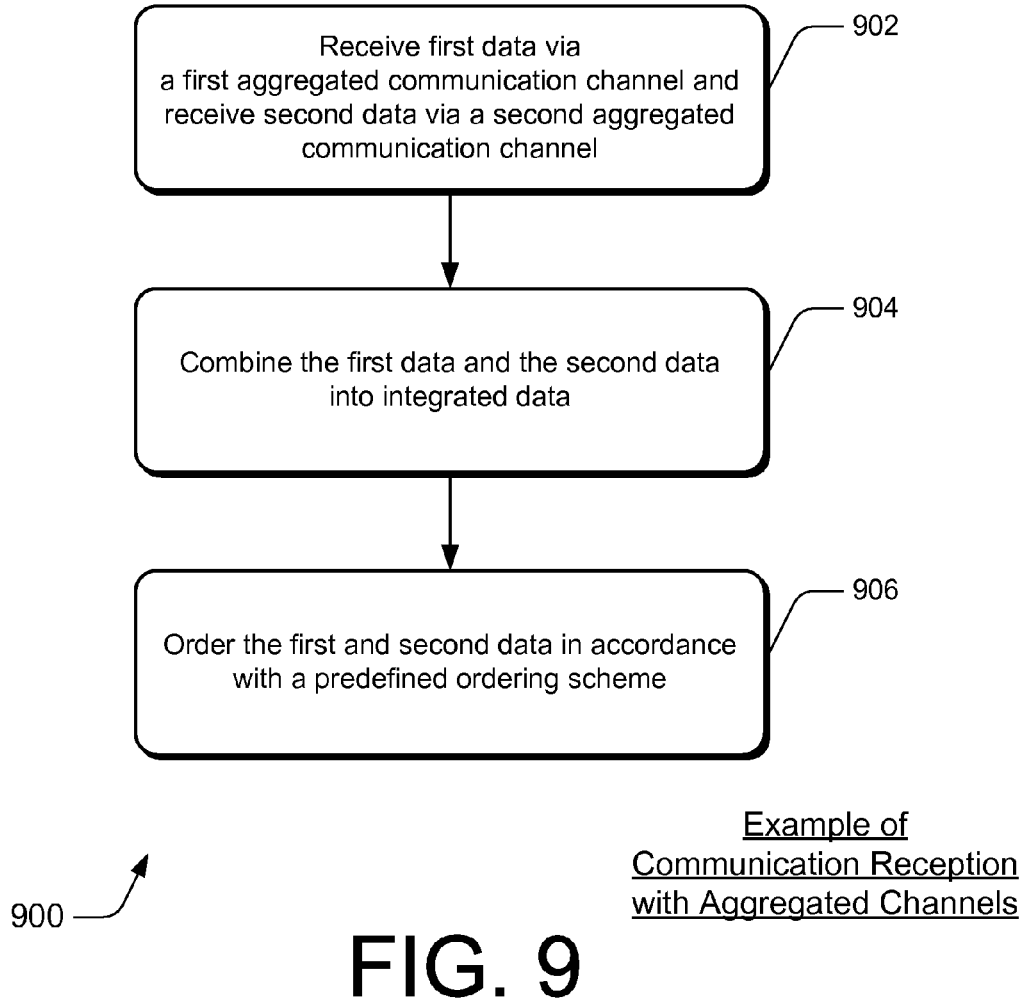
FIG. 9 is a flow diagram that illustrates an example method for communication reception using channel aggregation.

FIGS. 8 and 9 are flow diagrams 800 and 900, respectively, illustrating example methods related to implementing channel aggregation. Flow diagram 800 includes three (3) blocks 802-806, and flow diagram 900 includes three (3) blocks 902-906. Implementations of these flow diagrams 800 and 900 may be realized, for example, as processor-executable instructions 310. The actions of flow diagrams 800 and 900 may be performed in many different environments and with a variety of wireless communication devices, including by a base station 102 or a subscriber station 104 (both of FIGS. 1, 3A, and 3B). Example implementations for flow diagrams 800 and 900 that are described below also refer to other FIGS. that are described elsewhere herein. The order in which the methods are described is not intended to be construed as a limitation, and any number of the described blocks can be combined, augmented, rearranged, and/or omitted to implement a respective method, or an alternative method that is equivalent thereto.

FIG. 8 is a flow diagram 800 that illustrates an example method for communication transmission using channel aggregation. At block 802, at least two communication channels are aggregated for wireless data communication, with the two communication channels including a first aggregated communication channel and a second aggregated communication channel. For example, a first communication channel 110(1) may be aggregated to a second communication channel 110(2) (of FIG. 1).

Example communication channel characteristics and communication channel combinations are presented. Communication channels 110(1) and 110(2) may be adjacent or non-adjacent. Non-adjacent channels may be in the same frequency band or in different bands. Two aggregated communication channels 110 may be any of the following combinations: licensed (L) and non-exclusively-licensed (NEL), both L, both NEL, and so forth. Furthermore, additional embodiments of channel aggregation may include any two or more aggregated communication channels that have a disparity in transmission power regulation, filtering, or other differences. Other channel characteristics and combinations may alternatively be implemented.

At block 804, integrated data is divided for data communication via the first and second channel-aggregated communication channels. For example, data for a single service 112 may be divided (as at burst construction queue 610) into first data for first communication channel 502(1) and second data for second communication channel 502(2) (of FIG. 6). For instance, integrated data for subscriber station 3 (SS 3) may be divided into a first data set for "DL Burst 3A" and a second data set for "DL Burst 1B", as is illustrated in FIG. 6. Although an individual subscriber station 104 need not address communications for multiple other subscriber stations 104, each subscriber station 104 that is participating in a channel-aggregated communication can divide its integrated data into multiple data sets for multiple respective channel-aggregated communication channels, prior to transmission.

At block 806, first data is transmitted via the first aggregated communication channel and second data is transmitted via the second aggregated communication channel. For example, first data (e.g., "DL Burst 3A" for SS 3 of FIG. 6) may be transmitted via first aggregated communication channel 502(1), and second data (e.g., "DL Burst 1B") may be transmitted via second aggregated communication channel 502(2).

In a particular example embodiment, the first data and the second data may be communicated using an OFDMA scheme via non-adjacent, channel-aggregated communication channels. The first data may be transmitted, for instance, via a licensed communication channel for a relatively high quality of service, and the second data may be simultaneously transmitted via a non-exclusively-licensed communication channel for best-effort data communication.

FIG. 9 is a flow diagram 900 that illustrates an example method for communication reception using channel aggregation. At block 902, first data is received via a first aggregated communication channel, and second data is received via a second aggregated communication channel. For example, first data (e.g., "DL Burst 3A" for SS 3 of FIG. 6) may be received via a first aggregated communication channel 502(1) while second data (e.g., "DL Burst 1B") may be simultaneously received via a second aggregated communication channel 502(2).

Although the examples given for FIGS. 8 and 9 refer to a downlink aggregated channel communication, they are also applicable to an uplink aggregated channel communication. In other words, a subscriber station can also implement the actions of flow diagram 800, and a base station can also implement the actions of flow diagram 900.

At block 904, the first data and the second data are combined into integrated data. For example, the first data and the second data may be combined into integrated data for a single service 112 at a receiving subscriber station 104 (or base station 102).

At block 906, the first data and the second data are ordered in accordance with a predefined ordering scheme. For example, the first data and the second data of each burst may be received in any order, including fully or partially simultaneously. The first and second data sets are thus reordered so as to maintain the intended meaning and coherency of the original integrated data. In other words, the order of the integrated data prior to its division at a transmitting wireless communication device is restored at a receiving wireless communication device.

Generally, a given ordering scheme may be applied at the transmitting wireless device and/or the receiving wireless device. An ordering scheme may be a predefined default ordering, a numbering sequence protocol included with the data, and so forth. By way of example only, a numbering sequence protocol may entail data that is ordered according to an automatic retransmit request (ARQ) numbering sequence protocol that is already included along with the data in some wireless communication schemes. Alternatively, or in addition, the data packets can be ordered according to a special channel-aggregated numbering sequence that is annotated to the data.

More specifically, for a default ordering scheme, all of the data received on a first aggregated channel can be considered logically earlier in a data communication sequence than data received on a second channel, irrespective of which data arrives earlier or a simultaneous arrival on the first and second channels. Also, if the division between aggregated channels is performed on an entire service basis (e.g., all data of one service for a particular subscriber station is sent over a first channel, and all data of another service for the particular subscriber station is sent over a second channel), there is no numbering problem. In general, a predefined ordering scheme is applicable for those services that can have data packets for the same service take different paths. However, a priori knowledge that at least one higher layer already has an order preservation scheme can be used to simplify ordering for data that has been divided for channel aggregation.

For a numbering sequence protocol scheme, data can be ordered by a special channel-aggregating numbering sequence that annotates the data with a channel ordering indicator when communicated via the channel-aggregated communication channels. Alternatively, the data can be ordered using the ARQ numbering sequence protocol when the data is communicated via channel-aggregated communication channels. An ARQ is also commonly referred to as an automatic "resend" request or an automatic "repeat" request. ARQ is a protocol for error control when transmitting data. When a receiving device detects a corrupt data packet, it can automatically request that a transmitting device resend the data packet using the ARQ sequence number. Consequently, an ARQ sequence number can be used for data packet sequence numbering with divided data that is received over two or more aggregated channels, as well as to detect corrupt or missing data. Alternatively, if a higher network layer or level is already known to include a numbering sequence protocol, the numbering from the higher network layer or level may be relied on to maintain an intended order with multiple aggregated channels.

Figure 10:
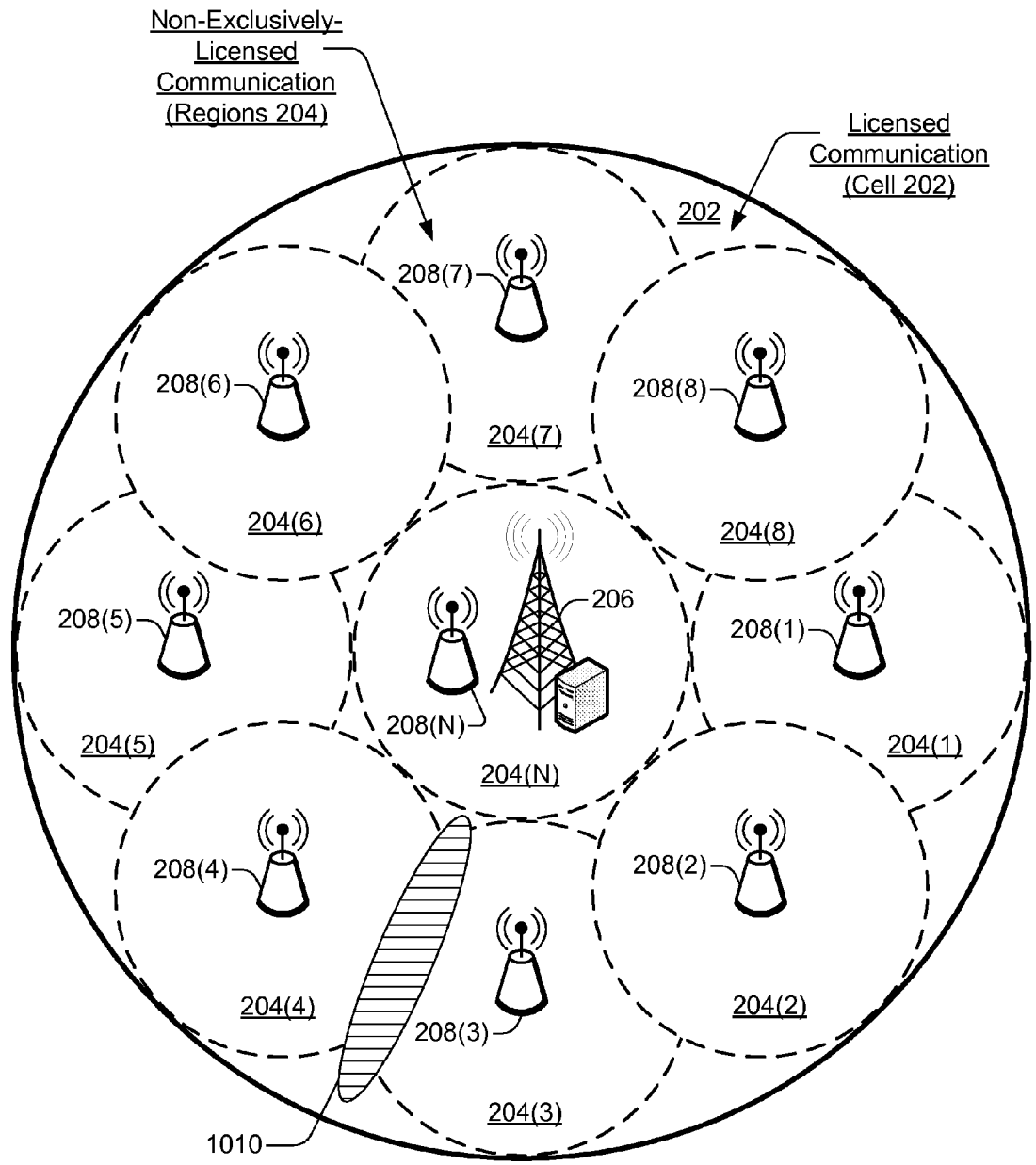
FIG. 10 illustrates an example wireless environment that includes a licensed communication region and multiple non-exclusively-licensed communication regions, and in which embodiments of channel aggregation can be implemented.
Figure 11:
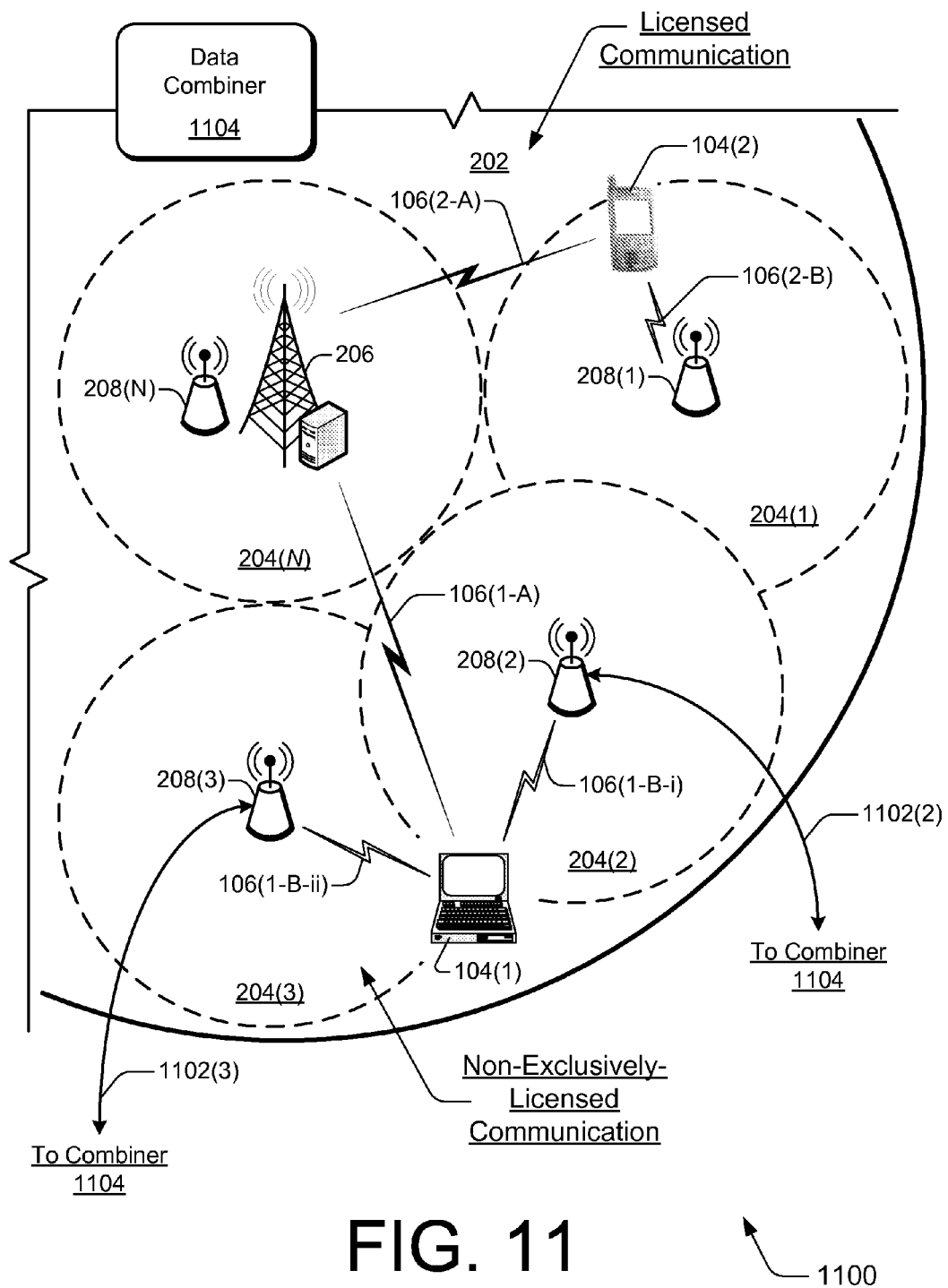
FIG. 11 illustrates examples of channel-aggregated wireless communication in a portion of the environment shown in FIG. 10.

With reference again to FIG. 2, a specific example is illustrated as described in detail herein above. In this specific example, a BTS 206 is associated with a first communication region 202. BTS 206 transceives via first communication channel 110(1). An AP 208 is associated with a second communication region 204. AP 208 transceives via second communication channel 110(2). FIGS. 10 and 11 illustrate a more particular example in which first communication region 202 corresponds to a licensed communication region and second communication region 204 corresponds to a non-exclusively-licensed region. This particular example, without loss of generality, is used to describe other general principles and alternatives of channel aggregation.

FIG. 10 illustrates an example wireless environment 1000 that includes a licensed communication region 202 and multiple non-exclusively-licensed communication regions 204, and in which embodiments of channel aggregation can be implemented. By way of example only, the description of FIGS. 10 and 11 refers to region 202 as a cell. Thus, wireless environment 1000 includes a licensed communication cell 202 and multiple overlapping non-exclusively-licensed communication regions 204(1-N) that are positioned or located substantially within cell 202.

Wireless communication throughout licensed communication cell 202 is facilitated by BTS 206 that communicates (e.g., transmits and/or receives) data for wireless communication. Each non-exclusively-licensed communication region 204 includes a respective wireless AP 208(1-N) that facilitates wireless communication within the respective non-exclusively-licensed communication region 204(1-N).

BTS 206 and each of APs 208(1-N) can be implemented to operate in a channel aggregated mode in which wireless data is communicated via channel-aggregated communication channels. For example, BTS 206 can communicate data for wireless data communication in which a first data set is transmitted via a licensed communication channel (within licensed communication cell 202) while a second data set is simultaneously transmitted by at least one AP 208 via a non-exclusively-licensed communication channel (within at least one non-exclusively-licensed communication region 204). As is described more fully herein below, utilizing non-exclusively-licensed communication regions 204(1-N) can increase overall capacity (e.g., bandwidth) and/or improve diversity gain for wireless data communication, depending on whether different signals or the same signals, respectively, are transmitted within regions 204(1-N).

In example wireless environment 1000, non-exclusively-licensed communication regions 204(1-N) may tend to have a lower allowable transmit power and/or other constraints that are commonly imposed on jointly-used spectrum bands. They are also likely subject to increased communication interference. For increased diversity gain, APs 208(1-N) in their respective non-exclusively-licensed communication regions 204(1-N) can therefore each be implemented so as to communicate the same data between subscriber stations and the wireless system. In other words, each of the APs 208(1-N) that receives data from the wireless system can transmit it on the same non-exclusively-licensed communication channel to subscriber stations within wireless communication range. Hence, a targeted subscriber station can potentially receive multiple versions of the same communication from multiple APs 208, especially when the targeted subscriber station is in an overlapping region such as boundary region 1010. The non-exclusively-licensed communication channel of APs 208 can be aggregated to a licensed communication channel being used by BTS 206.

FIG. 11 illustrates examples of channel-aggregated wireless communication in a portion of the environment 1000 that is shown in FIG. 10. The portion shown in FIG. 11 illustrates part of an example wireless communication system 1100 having multiple wireless devices including subscriber stations 104, a BTS 206, and multiple APs 208, as well as a data combiner 1104. As illustrated, wireless communication system 1100 includes licensed communication cell 202 and BTS 206 that can communicate (e.g., transmit and/or receive) data for wireless data communication. Wireless communication system 1100 also includes non-exclusively-licensed communication regions 204(1-3, N) and respective APs 208(1-3, N) that are within the portion of wireless environment 1000 (of FIG. 10) that is illustrated in FIG. 11.

Wireless communication system 1100 includes examples of subscriber stations 104(1-2) that can each communicate (e.g., transmit and/or receive) data for wireless data communication within licensed communication cell 202 and/or within one or more of non-exclusively-licensed communication regions 204. By way of example only, subscriber station 104(1) is illustrated as a laptop computer, and subscriber station 104(2) is illustrated as an intelligent mobile phone and/or wireless PDA.

Various communication links 106 are shown between (i) BTS 206 and APs 208(1-3) and (ii) subscriber stations 104 (1-2) to illustrate channel-aggregated wireless communication between the wireless devices. For example, subscriber station 104(2) can communicate first data with BTS 206 via a licensed communication link 106(2-A) that represents a channel-aggregated licensed communication channel. Subscriber station 104(2) can also simultaneously communicate second data with AP 208(1) via a non-exclusively-licensed communication link 106(2-B) that represents a channel-aggregated non-exclusively-licensed communication channel.

In this example with subscriber station 104(2), a first aggregated communication channel 110(1) (of FIG. 1) corresponds to communication link 106(2-A), and a second aggregated communication channel 110(2) corresponds to communication link 106(2-B). Somewhere within wireless communication system 1100, aggregated communication channels 110(1) and 110(2) are combined, possibly for a single service 112. This is described further below with regard to subscriber station 104(1).

In the context of channel aggregation, simultaneous communication on two (or more) communication links 106 and/or two (or more) aggregated channels 110 (of FIG. 1) implies that communication is occurring at the same moment (e.g., during the same burst periods, frames, subframes, and/or time periods, etc.) at least part of the time. It should be recognized that there are other moments when transceiving may only be occurring on one of the aggregated communications just as their will likely be instantaneous moments when there is no transceiving on any of the aggregated communications, at least with air interface technologies involving some time division of the medium. Consequently, from time to time, certain portions of the first data may arrive prior to portions of the second data, or vice versa.

As another example in wireless communication system 1100, subscriber station 104(1) can communicate a first data set with BTS 206 via a licensed communication link 106(1-A) that represents a channel-aggregated licensed communication channel. Subscriber station 104(1) can also simultaneously communicate a second data set with AP 208(2) via a non-exclusively-licensed communication link 106(1-B-i) and/or with AP 208(3) via a non-exclusively-licensed communication link 106(1-B-ii), each of which represents a channel-aggregated non-exclusively-licensed communication channel.

In this example with subscriber station 104(1), a first aggregated communication channel 110(1) (of FIG. 1) corresponds to communication link 106(1-A), and a second aggregated communication channel 110(2) corresponds to communication link 106(1-B-i) and/or communication link 106(1-B-ii). For this example, it is given that each AP 208(1-N) is transceiving the same data. Thus, the second data set received via both communication link 106(1-B-i) and communication link 106(1-B-ii) can be combined using a diversity combining mechanism.

In order to perform this diversity combining, the two versions of the second data set are forwarded to data combiner 1104 via links 1102(2) and 1102(3). Data combiner 1104 may be located at a centralized location, at BTS 206, at an AP 208, or any other location accessible by wireless communication system 1100. These links 1102 may be wireless links or wired links. When wireless communication system 1100 is transmitting to a subscriber station 104, a data divider or splitter that is analogous to data combiner 1104 is employed.

With channel aggregation generally, the first data set received via communication link 106(1-A) and the second data set received via communication link 106(1-B) are combined to form integrated data at data combiner 1104. This combination may be performed as part of a channel aggregation module (e.g., BS channel aggregation module 320) that is located anywhere within wireless communication system 1100, including some centralized data processing facility. This data combination is illustrated generically as data combiner 1104. The data combination for diversity combining and the data combination for channel aggregation may be performed at the same location or at different locations. (For a subscriber station 104, channel aggregation data combining may be performed by SS channel aggregation module 354.)

With channel aggregation data combination, the first data set and the second data set are forwarded (e.g., using a backhaul version of network 108) to one location for combining into the integrated data. By way of example only, the second data set can be forwarded from AP(s) 208 using links 1102 to BTS 206. In this case, links 1102 may be realized as a wireless signal (including a copied signal that results in APs performing a relay function), a wired signal, a point-to-point microwave signal, some combination thereof, and so forth. If the first data set is forwarded to a third location for combining, a wireless or wired link (not separately shown) from BTS 206 that is analogous to links 1102 may be used.

By way of example only, data can be communicated between (i) BTS 206 and APs 208 (1-3, N) and (ii) subscriber stations 104(1-2) in a point-to-multipoint fashion utilizing OFDMA via the channel aggregated communication channels. The IEEE 802.16 standard is one example of a standard that supports OFDMA systems. Other examples include, but are not limited to, asymmetric digital subscriber line (ADSL) systems, some broadband wireless access systems (e.g., draft standard IEEE 802.22), contemplated 4th Generation (4G) wireless standards (which may include IEEE 802.16), and so forth.

In an example embodiment, channel-aggregating a licensed communication channel and a non-exclusively-licensed communication channel for data communication can take advantage of the non-exclusively-licensed spectrum to effectively increase available bandwidth by an order of magnitude over competitors that may have similar licensed communication spectrums. Further, the aggregated licensed and non-exclusively-licensed communication channels need not be the same width to implement channel aggregation. For example, a 5 MHz licensed communication channel from the WCS band can be aggregated with a 6 MHz non-exclusively-licensed communication channel using unused television signal spectrum, or it can be aggregated with a 10 MHz non-exclusively-licensed communication channel.

Efficiency, improved service, etc. can be gained for wireless data communication when data is communicated via channel-aggregated communication channels. For example, first data having a higher quality need, such as voice or other real-time data, can be transmitted via a relatively higher quality aggregated channel, and second data which is suitable for best efforts can be transmitted via a relatively lower quality aggregated channel. Typically, but not universally, a licensed communication channel has a higher quality of service than a non-exclusively-licensed communication channel. Also, two aggregated non-exclusively-licensed communication channels can have two different quality levels, such as when one is experiencing more interference than the other. In such examples, the communication channel having the lower quality of service is selected for communicating a greater amount of the integrated data.

Alternatively, and on the other hand, data can be primarily communicated via a non-exclusively-licensed communication channel so as to leave the licensed communication channel open to communicate automatic retransmit requests (ARQ) and acknowledgements (ACKs). This can reduce the number of retransmissions while minimizing the data load and thus increasing the apparent bandwidth capacity on the licensed communication channel.

In another example embodiment of channel aggregation, data for wireless communication can be switched from one aggregated channel to another if transmitting and/or receiving conditions change. For instance, data can be communicated primarily via a non-exclusively-licensed communication channel but quickly switched to a aggregated, licensed communication channel if too much interference is encountered on the non-exclusively-licensed communication channel or its quality otherwise decreases.

As mentioned above, each AP 208(1-N) may be transmitting and/or receiving the same data or each AP 208(1-N) may be transmitting and/or receiving different data. When different data is being transmitted by APs 208, there is an automatic capacity gain as each second communication region 204 effectively becomes a mini-cell. With the same data being transmitted by APs 208, capacity is not automatically increased. However, a diversity gain can result, especially in overlapping boundary regions such as boundary region 1010 (of FIG. 10).

As a subscriber station 104 roams throughout the licensed communication cell 202, the aggregated licensed communication channel remains consistently supported by BTS 206 while the non-exclusively-licensed communication channel is supported by different APs 208 as the subscriber station 104 moves from one non-exclusively-licensed communication region 204 to an adjacent region 204.

Generally, when the same data is being transmitted by each AP 208, there are opportunities for statistical multiplexing gains and/or signal path diversity gains, especially when a subscriber station 104 is located at a boundary between two non-exclusively-licensed communication regions 204(1-N), such as at boundary region 1010 between non-exclusively-licensed communication regions 204(3) and 204(4). There are also opportunities for diversity gains because multiple, up to all of, APs 208(1-N) can receive different versions of the same data from a subscriber station 104. These different versions can be combined using any of a number of well known diversity combining mechanisms.

This capacity versus diversity gain implementation option is discussed below in the context of an example channel aggregation between a licensed and a non-exclusively-licensed channel. Usually, non-exclusively-licensed channels have a lower allowable transmit power and are subject to increased interference relative to licensed channels. Overlaying a first communication region 202 with multiple second communication regions 204 can effectively use the first issue to mitigate the second issue, as is described below.

In FIGS. 10 and 11, a cell 202 with a licensed BTS footprint has an underlay comprised of multiple overlapping non-exclusively-licensed AP footprints (204) that are sufficient to substantially cover the licensed BTS footprint. In this example situation, instead of striving for maximum capacity in the non-exclusively-licensed spectrum, the identified goals are increasing robustness and eliminating handoff between these smaller non-exclusively-licensed cells. For this example, it is given that there is channel aggregation of a single licensed channel and a single non-exclusively-licensed channel under the control of a single centralized MAC layer that can distribute traffic appropriately.

To pursue these two identified goals, the non-exclusively-licensed APs in the BTS footprint transmit the same data on the same channel. Any AP that hears a subscriber forwards the data up to the centralized MAC. At the boundaries (e.g., boundary 1010) of the non-exclusively-licensed cells, there is likely a diversity gain at the subscriber station's receive because it receives identical data from multiple APs with small differences in arrival time. If properly constructed to do combining at a centralized location, the receiving APs can provide uplink diversity gain. Additionally, a MAC layer diversity gain can be achieved by receiving multiple copies of the same protocol data unit (PDU) from the subscriber station, which can be used to reduce the need for ARQ retransmissions.

This diversity gain effectively enables the non-exclusively-licensed spectrum to be used for additional capacity. Once the additional capacity is achieved, it can be traded off for additional coverage by using stronger codes to achieve robustness at greater distance with the non-exclusively-licensed spectrum adding back the throughput that may be lost. The stronger codes can be ones from a given standard, or, if the standard is extensible, new codes can be utilized if wireless devices on both ends of a link understand the new codes.

The description above presents the capacity increase versus a diversity gain tradeoff as if the only option is for all APs 208 to transmit the same data or for all APs 208 to transmit different data. However, an alternative implementation takes a middle ground. This alternative entails selected APs 208 to be transmitting the same data while other APs 208 within cell 202 are transmitting different data. For example, with reference to FIG. 11, APs 208(2, 3, N) may be transceiving the same data with subscriber station 104(1) while other APs (e.g., 208(1) and 208(4-8)) may be transceiving different data. This enables some statistical multiplexing through a subset of APs 208 and a capacity gain through other APs 208. It does entail some centralized coordination and/or decentralized decision-making, for example using received signal strength and or location techniques to determine which sets of APs 208 are to communicate with which subscriber stations 104.

In short, when APs 208 transmit the same data and channels, there is no automatic bulk capacity increase, but there can be a multiplexing and a diversity gain. Additionally, there are fewer handovers between APs 208, and a greater interference tolerance. When APs 208 transmit different data, there are no multiplexing or diversity gains, and there is an added handover complexity. However, bulk capacity can be automatically increased.

A capacity increase versus a diversity gain tradeoff implementation option is described relatively qualitatively above. The bulk capacity increase option involves a handover complexity when a subscriber station 104 moves from one second communication region 204 to another second communication region 204. The diversity gain option forfeits the bulk capacity gain but avoids the handover complexity. This capacity increase versus a diversity gain tradeoff issue is described below relatively quantitatively.

Generally, increasing the capacity of a wireless system is advantageous. The following Equation 1 reflects a system's capacity and is termed the Shannon capacity formula:

$$C = BW \log_2\left(1 + \frac{S}{I+N}\right), \quad \text{(Eqn 1)}$$

where S, I, and N denote signal (S), interference (I), and noise (N) power spectral densities, respectively. When the signal, interference, and noise are frequency dependent, the capacity formula becomes as shown in Equation 2:

$$C = \int_0^{BW} \log_2\left(1 + \frac{S(f)}{I(f)+N(f)}\right). \quad \text{(Eqn 2)}$$

From the formulas above, it is apparent that increasing system bandwidth contributes linearly to the system capacity, whereas increasing the system's SINR contributes only logarithmically to the system capacity. Therefore, when more bandwidth is added to the system, whether as a licensed, non-exclusively-licensed, or other communication channel, the additional bandwidth can be used to linearly increase the system capacity.

With respect to interference considerations, non-exclusively-licensed frequency bands, such as the ISM band at 2.4 GHz may be initially viewed as having a lower capacity due to increased interference. In reality, however, cellular communication systems can suffer from high inter-cell interference that can be only somewhat mitigated by interference cancellation or interference avoidance schemes.

With respect to power considerations, ISM bands for point-to-point communication are limited in the 2.4 GHz ISM band by the amount of directional antenna gain. Practical systems may exhibit 42 dBm transmit power, which is similar to the allowable power in licensed bands sans the antenna gain. In the uplink, the power difference is essentially non-existent as mobile subscribers typically transmit up to 24 dBm, which is less than the FCC limit in most non-exclusively-licensed bands. Consequently, another option for allocating between two aggregated channels is: a non-exclusively-licensed band can be used for the uplink to free-up the licensed band for downlink transmissions.

If a subscriber station 104 has multiple receive data paths and one transmit data path (e.g., multiple receive chains and one transmitting chain), one of the data receive paths can be allocated to the licensed band and the other data receive path can be allocated to the non-exclusively-licensed band given that the bands are not contiguous. Based on CINR measurements, a base station 102 can maximize capacity by deciding how best to utilize the two receive chains. With two receive chains that are used in one band, on the other hand, a subscriber station 104 can use maximum ratio combining (MRC) to reduce the required CINR and thus increase capacity whereas splitting each antenna for different bands increases the available bandwidth.

The following metric can be used as presented in Equation 3:

$$\max\left\{\int_0^{BW(L)} \log_2\left(1 + \frac{CINR(L)_{with}2Rx}{\Gamma}\right), \quad \text{(Eqn 3)}\right.$$
$$\int_0^{BW(L)} \log_2\left(1 + \frac{CINR(L)_{with}1Rx}{\Gamma}\right) +$$
$$\left.\int_0^{BW(LE)} \log_2\left(1 + \frac{CINR(LE)_{with}1Rx}{\Gamma}\right)\right\}$$

where BW(L) is the bandwidth of the licensed system and $\Gamma$ is the gap from capacity that depends on the error correction capability of the system. Similarly, a subscriber station 104 with one transmit antenna can choose a band based on the metric presented in Equation 4 below:

$$\max\left\{\int_0^{BW(L)} \log_2\left(1 - \frac{CINR(L)}{\Gamma}\right), \quad \text{(Eqn 4)}\right.$$
$$\left.\int_0^{BW(LE)} \log_2\left(1 + \frac{CINR(LE)}{\Gamma}\right)\right\}$$

where CINR is measured in the uplink.

Other example channel aggregation implementations, including how data may be directed to each of the multiple aggregated channels, are described below. For example, real-time data such as VoIP can be transceived on a first aggregated channel while non-real-time data can be transceived on a second aggregated channel. The first channel can be a licensed channel, and the second channel can be a non-exclusively-licensed channel, or vice versa. In an OFDMA-based implementation, non-Hybrid Automatic-Repeat-Request (non-HARQ) connections can be transceived on a first aggregated channel while HARQ connections can be transceived on a second aggregated channel. The first channel can be a licensed channel, and the second channel can be a non-exclusively-licensed channel, or vice versa.

As another channel aggregation example with at least first and second aggregated channels, the first aggregated channel can include DL/UL maps and/or control channels for both of the first and second aggregated channels. The second aggregated channel then need only include data in the downlink. This may reduce the likelihood that a subscriber station that is not capable of channel aggregation can utilize either channel, especially the second aggregated channel that does not include a DL/UL map and/or a control channel. The first and second aggregated channels may be non-adjacent.

As yet another channel aggregation example with at least first and second aggregated channels, the first aggregated channel can include an uplink portion while the second aggregated channel does not include an uplink portion. Both of the first and second aggregated channels include a downlink portion. These channels may be adjacent or nonadjacent. This example implementation may be applied to broadcast scenarios in which it may be beneficial to provide greater bandwidth for the downlink communications relative to the uplink communications. Also, an opposite channel-aggregation scenario may be implemented in which of two aggregated channels, both channels have uplink portions, but one omits the downlink portion while the other includes it. Generally, other channel-aggregation scenarios may include alternative numbers of channels and combinations of uplink and downlink portions.

The devices, actions, aspects, features, functions, procedures, modules, schemes, approaches, architectures, components, etc. of FIGS. 1-11 are illustrated in diagrams that are divided into multiple blocks. However, the order, interconnections, interrelationships, layout, etc. in which FIGS. 1-11 are described and/or shown are not intended to be construed as a limitation, and any number of the blocks can be modified, combined, rearranged, augmented, omitted, etc. in any manner to implement one or more methods, apparatuses, systems, devices, procedures, media, arrangements, etc. for channel aggregation.

Moreover, although systems, apparatuses, devices, media, methods, procedures, techniques, schemes, approaches, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method comprising:
   transmitting, by a base transceiver station in a first communication region, first data on a first channel to a first wireless device;
   simultaneously transmitting, by a first access point in a second communication region, second data on a second channel to the first wireless device such that the first data and the second data are transmitted in a coordinated manner by aggregating the first channel and the second channel, wherein the first channel and the second channel are located in different bands; and
   simultaneously transmitting, by a second access point, the second data on the second channel to the first wireless device in a third communication region;
   wherein the second communication region at least partially overlaps the third communication region; and
   wherein each of the first channel and the second channel is independently and properly formed so that a second wireless device that is unable to support channel aggregation is capable of communicating by independently using one of the first channel or the second channel.

2. The method as recited in claim 1, further comprising:
   receiving from the first wireless device a first version of third data on the second channel at the first access point;
   receiving from the wireless device a second version of the third data on the second channel at the second access point; and
   combining the first version of the third data and the second version of the third data using at least one diversity combining mechanism.

3. A method comprising:
   transmitting, by a base transceiver station in a first communication region, first data on a first channel to a first wireless device;
   simultaneously transmitting, by a first access point in a second communication region, second data on a second channel to the first wireless device such that the first data and the second data are transmitted in a coordinated manner by aggregating the first channel and the second channel, wherein the first channel and the second channel are located in different bands;
   receiving third data on the second channel at the first access point from the wireless device; and
   relaying the third data from the first access point to the base transceiver station;
   wherein each of the first channel and the second channel is independently and properly formed so that a second wireless device that is unable to support channel aggregation is capable of communicating by independently using one of the first channel or the second channel.

4. A method comprising:
   directing first data comprising automatic retransmit request (ARQ) data toward a first channel based on a first characteristic of the first channel, wherein the first channel comprises a licensed channel;
   directing second data comprising general data toward a second channel based on a second characteristic of the second channel, wherein the second channel comprises a non-exclusively-licensed channel;
   transmitting to a first wireless device the first data on the first channel; and
   simultaneously transmitting to the first wireless device the second data on the second channel such that the first data and the second data are transmitted in a coordinated manner by aggregating the first channel and the second channel;
   wherein each of the first channel and the second channel is independently and properly formed so that a second wireless device that is unable to support channel aggregation is capable of communicating by independently using one of the first channel or the second channel.

5. A method comprising:
   directing first data toward a first channel based on a first characteristic of the first channel when a first wireless device is mobile, wherein the first channel comprises a licensed channel;
   directing second data toward a second channel based on a second characteristic of the second channel when the first wireless device is stationary, wherein the second channel comprises a non-exclusively-licensed channel;
   transmitting to the first wireless device the first data on the first channel; and
   simultaneously transmitting to the first wireless device the second data on the second channel such that the first data and the second data are transmitted in a coordinated manner by aggregating the first channel and the second channel;
   wherein each of the first channel and the second channel is independently and properly formed so that a second wireless device that is unable to support channel aggregation is capable of communicating by independently using one of the first channel or the second channel.

6. A method comprising:
   directing first data comprising automatic repeat request (ARQ) data toward a first channel, wherein the first channel has a lower level of interference than a second channel;

directing second data comprising general data toward the second channel, wherein the second channel has a higher level of interference than the first channel;

transmitting to a first wireless device the first data on the first channel; and simultaneously transmitting to the first wireless device the second data on the second channel such that the first data and the second data are transmitted in a coordinated manner by aggregating the first channel and the second channel;

wherein each of the first channel and the second channel is independently and properly formed so that a second wireless device that is unable to support channel aggregation is capable of communicating by independently using one of the first channel or the second channel.

7. A method comprising:

directing first data toward a first channel comprising a licensed channel based on a first characteristic of the first channel, wherein the first characteristic comprises a first channel quality level;

directing second data toward a second channel comprising a non-exclusively-licensed channel based on a second characteristic of the second channel, wherein the second characteristic comprises a second channel quality level;

increasing a size of the first data relative to a size of the second data responsive to the second channel quality level dropping relative to the first channel quality level;

transmitting to a first wireless device the first data on the first channel; and simultaneously transmitting to the first wireless device the second data on the second channel such that the first data and the second data are transmitted in a coordinated manner by aggregating the first channel and the second channel;

wherein each of the first channel and the second channel is independently and properly formed so that a second wireless device that is unable to support channel aggregation is capable of communicating by independently using one of the first channel or the second channel.

8. A method comprising:

directing first data comprising downlink data toward a first channel based on a first characteristic of the first channel, wherein the first characteristic comprises a licensed channel characteristic;

directing second data comprising uplink data toward a second channel based on a second characteristic of the second channel, wherein the second characteristic comprises a non-exclusively-licensed channel characteristic;

transmitting to a first wireless device the first data on the first channel; and simultaneously transmitting to the first wireless device the second data on the second channel such that the first data and the second data are transmitted in a coordinated manner by aggregating the first channel and the second channel;

wherein each of the first channel and the second channel is independently and properly formed so that a second wireless device that is unable to support channel aggregation is capable of communicating by independently using one of the first channel or the second channel.

9. A method comprising:

directing first data comprising non-Hybrid Automatic-Repeat-Request (non-HARQ) data toward a first channel comprising a licensed channel based on a first characteristic of the first channel;

directing second data comprising HARQ data toward a second channel comprising a non-exclusively-licensed channel based on a second characteristic of the second channel;

transmitting to a first wireless device the first data on the first channel; and simultaneously transmitting to the first wireless device the second data on the second channel such that the first data and the second data are transmitted in a coordinated manner by aggregating the first channel and the second channel;

wherein each of the first channel and the second channel is independently and properly formed so that a second wireless device that is unable to support channel aggregation is capable of communicating by independently using one of the first channel or the second channel.

10. A method comprising:

directing first data toward a first channel based on a first characteristic of the first channel responsive to a speed of a first wireless device, wherein the first characteristic comprises a licensed channel characteristic;

directing second data toward a second channel based on a second characteristic of the second channel responsive to the speed of the first wireless device, wherein the second characteristic comprises a non-exclusively-licensed channel characteristic;

transmitting to the first wireless device the first data on the first channel; and simultaneously transmitting to the first wireless device the second data on the second channel such that the first data and the second data are transmitted in a coordinated manner by aggregating the first channel and the second channel;

wherein each of the first channel and the second channel is independently and properly formed so that a second wireless device that is unable to support channel aggregation is capable of communicating by independently using one of the first channel or the second channel.

11. The method as recited in claim 10, wherein:

a percentage of voice data allocated between the first data and the second data is adjusted responsive to the speed of the first wireless device.

12. A method comprising:

transmitting to a first wireless device first data on a downlink portion of a first channel;

simultaneously transmitting to the first wireless device second data on a downlink portion of a second channel such that the first data and the second data are transmitted in a coordinated manner by aggregating the first channel and the second channel; and receiving from the first wireless device third data on an uplink portion of the first channel;

wherein each of the first channel and the second channel is independently and properly formed so that a second wireless device that is unable to support channel aggregation is capable of communicating by independently using one of the first channel or the second channel; and wherein an uplink portion of the second channel is not used for receiving from the first wireless device.

13. A method comprising:

receiving from a first wireless device first data on an uplink portion of a first channel;

simultaneously receiving from the first wireless device second data on an uplink portion of a second channel such that the first data and the second data are received in a coordinated manner by aggregating the first channel and the second channel; and transmitting to the first wireless device third data on a downlink portion of the first channel;

wherein each of the first channel and the second channel is independently and properly formed so that a second wireless device that is unable to support channel aggregation is capable of communicating by independently using one of the first channel or the second channel; and wherein a downlink portion of the second channel is not used for transmitting to the first wireless device.

14. A method comprising:

transmitting to a wireless device first data on a first downlink portion of a first channel without including a first uplink/downlink map for the first channel; and simultaneously transmitting to the wireless device second data on a second downlink portion of a second nonadjacent channel such that the first data and the second data are transmitted in a coordinated manner by aggregating the first channel and the second nonadjacent channel, the second downlink portion of the second nonadjacent channel including the first uplink/downlink map for the first channel and a second uplink/downlink map for the second nonadjacent channel;

wherein the second downlink portion of the second nonadjacent channel further includes a first control channel for the first channel and a second control channel for the second nonadjacent channel.

15. A wireless device comprising:

a transmitting unit configured to transmit to a first wireless device first data on a first downlink portion of a first channel, wherein the transmitting unit is further configured to simultaneously transmit to the first wireless device second data on a second downlink portion of a second channel such that the first data and the second data are transmitted in a coordinated manner by aggregating the first channel and the second channel;

a receiving unit configured to receive from the first wireless device third data on a first uplink portion of the first channel, wherein the receiving unit is further configured to not receive from the first wireless device on a second uplink portion of the second channel; and a channel aggregation module configured to properly form each of the first channel and the second channel so that a second wireless device that is unable to support channel aggregation is capable of communicating by independently using one of the first channel or the second channel.

16. A wireless device comprising:

a receiving unit configured to receive from a first wireless device first data on a first uplink portion of a first channel, wherein the receiving unit is further configured to simultaneously receive from the first wireless device second data on a second uplink portion of a second channel such that the first data and the second data are received in a coordinated manner by aggregating the first channel and the second channel;

a transmitting unit to transmit to the first wireless device third data on a first downlink portion of the first channel, wherein the transmitting unit is further configured to not transmit to the first wireless device on a second downlink portion of the second channel; and a channel aggregation module to properly form each of the first channel and the second channel so that a second wireless device that is unable to support channel aggregation is capable of communicating by independently using one of the first channel or the second channel.

* * * * *